(12) United States Patent
Yasa et al.

(10) Patent No.: US 12,080,281 B2
(45) Date of Patent: Sep. 3, 2024

(54) GENERATING INPUT ALTERNATIVES

(71) Applicant: Amazon Technologies, Inc., Seattle, WA (US)

(72) Inventors: Ravi Chandra Reddy Yasa, Ashland, MA (US); Sai Rahul Reddy Pulikunta, North Andover, MA (US); Eliav Kahan, Jamaica Plain, MA (US); Gregory Newell, Waltham, MA (US)

(73) Assignee: Amazon Technologies, Inc., Seattle, WA (US)

( * ) Notice: Subject to any disclaimer, the term of this patent is extended or adjusted under 35 U.S.C. 154(b) by 37 days.

(21) Appl. No.: 18/160,403

(22) Filed: Jan. 27, 2023

(65) Prior Publication Data

US 2023/0298577 A1  Sep. 21, 2023

Related U.S. Application Data

(63) Continuation of application No. 17/109,449, filed on Dec. 2, 2020, now Pat. No. 11,580,960, which is a continuation of application No. 16/215,105, filed on Dec. 10, 2018, now Pat. No. 10,861,446.

(51) Int. Cl.
| | |
|---|---|
| *G10L 15/18* | (2013.01) |
| *G06F 16/31* | (2019.01) |
| *G06F 16/33* | (2019.01) |
| *G06N 20/00* | (2019.01) |
| *G10L 15/22* | (2006.01) |
| *G10L 15/26* | (2006.01) |

(52) U.S. Cl.
CPC ........ *G10L 15/1815* (2013.01); *G06F 16/313* (2019.01); *G06F 16/334* (2019.01); *G06N 20/00* (2019.01); *G10L 15/22* (2013.01); *G10L 15/26* (2013.01); *G10L 2015/223* (2013.01); *G10L 2015/225* (2013.01)

(58) Field of Classification Search
CPC ..... G10L 15/1815; G10L 15/22; G10L 15/26; G10L 15/1822; G10L 15/18; G10L 2015/223; G10L 2015/225; G06F 16/313; G06F 16/334; G06F 40/30; G06N 20/00
See application file for complete search history.

(56) References Cited

U.S. PATENT DOCUMENTS

| | | | | |
|---|---|---|---|---|
| 10,074,371 | B1 * | 9/2018 | Wang | G10L 15/08 |
| 10,140,973 | B1 * | 11/2018 | Dalmia | G06N 7/01 |
| 2014/0188477 | A1 * | 7/2014 | Zhang | G10L 15/22 |
| | | | | 704/257 |
| 2017/0285915 | A1 * | 10/2017 | Napolitano | G06F 16/438 |
| 2018/0182376 | A1 * | 6/2018 | Van Gysel | G10L 21/10 |
| 2018/0260680 | A1 * | 9/2018 | Finkelstein | G06N 5/04 |

* cited by examiner

*Primary Examiner* — Yogeshkumar Patel
(74) *Attorney, Agent, or Firm* — Pierce Atwood LLP

(57) ABSTRACT

Exemplary embodiments relate to a system for recovering a conversation between a user and the system when the system is unable to properly respond to a user's input. The system may process the user input and determine an error condition exists. The system may query one or more storage systems to identify candidate text data based on their semantic similarity to the user input. The storage systems may store data related to past frequently entered inputs and/or user-generated inputs. Alternative text data is selected from the candidate text data, and presented to the user for confirmation.

20 Claims, 14 Drawing Sheets

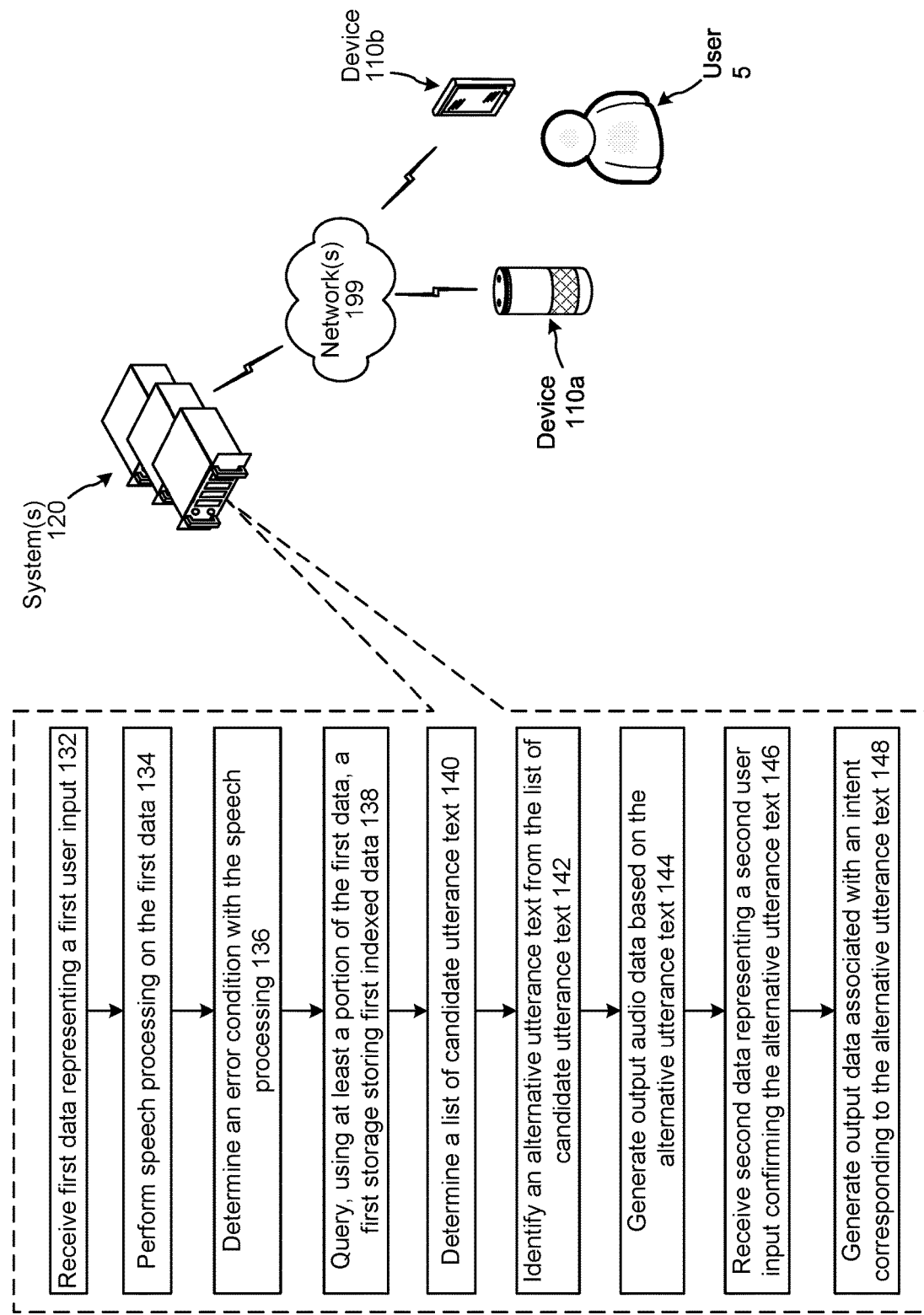

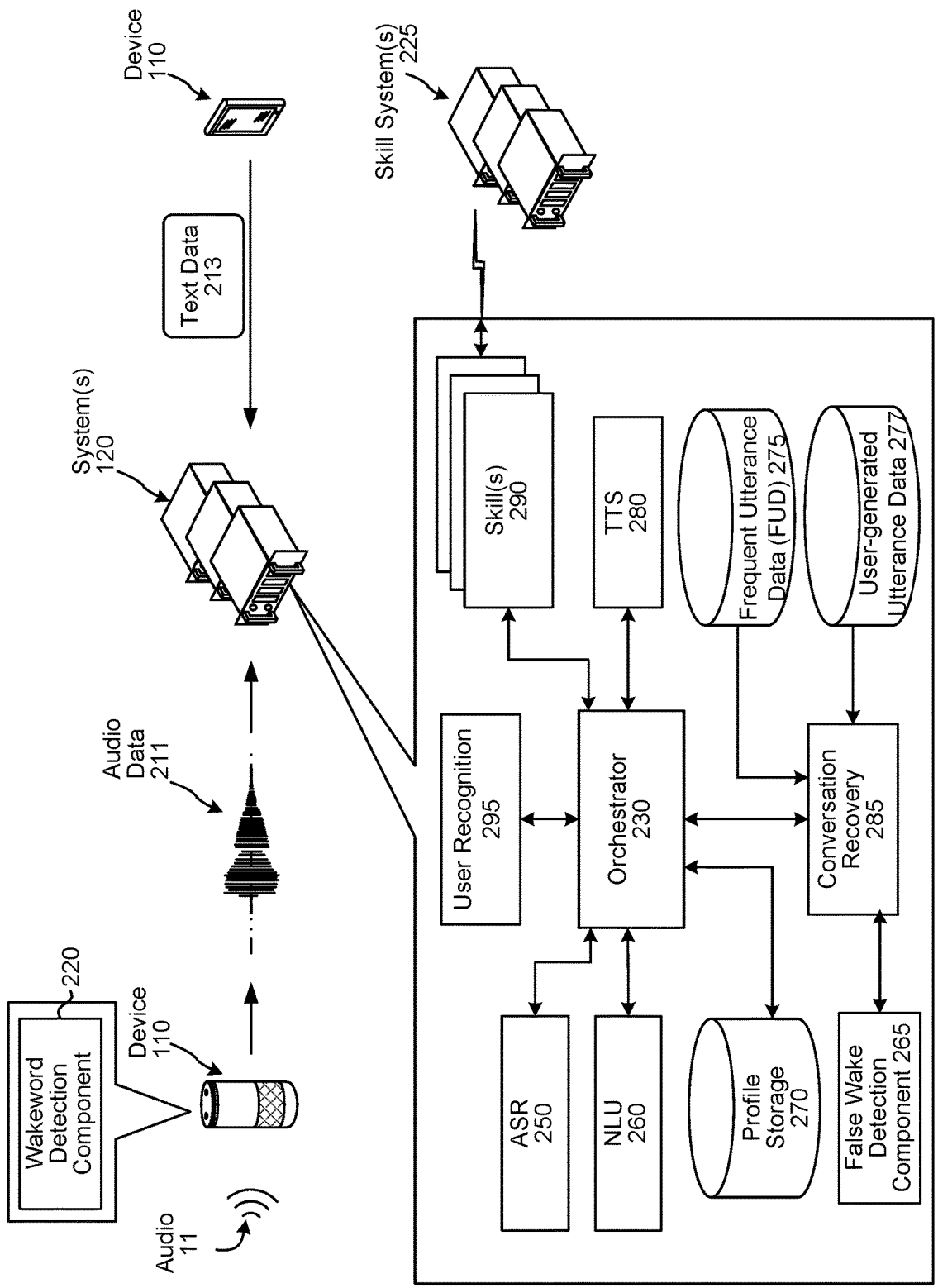

GENERATING INPUT ALTERNATIVES

CROSS-REFERENCE TO RELATED APPLICATIONS

This application is a continuation of, and claims the benefit of priority of, U.S. Non-Provisional application Ser. No. 17/109,449, filed Dec. 2, 2020, titled "GENERATING INPUT ALTERNATIVES," and scheduled to issue as U.S. Pat. No. 11,580,960, which is a continuation of, and claims the benefit of priority of, U.S. Non-Provisional patent application Ser. No. 16/215,105, filed Dec. 10, 2018, titled "GENERATING INPUT ALTERNATIVES," which issued as U.S. Pat. No. 10,861,446. The contents of each of which are hereby incorporated by reference in their entirety.

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 illustrates a system configured to perform conversation recovery according to embodiments of the present disclosure.

FIG. 2A is a conceptual diagram of components of a system according to embodiments of the present disclosure.

DETAILED DESCRIPTION

Figure 2B:
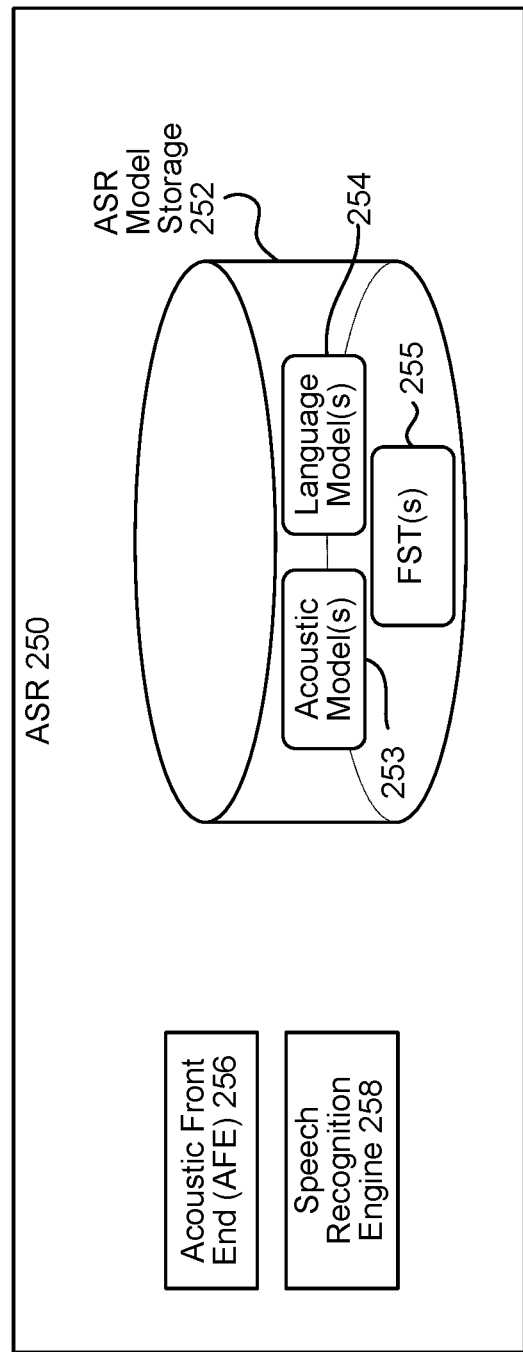
FIG. 2B is a conceptual diagram of automatic speech recognition components according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Certain systems may be configured to perform actions responsive to user inputs. For example, for the user input of "Alexa, play Adele music," a system may output music sung by an artist named Adele. For further example, for the user input of "Alexa, what is the weather," a system may output synthesized speech representing weather information for a geographic location of the user. In a further example, for the user input of "Alexa, send a message to John," a system may capture spoken message content and cause same to be output via a device registered to "John."

A system may encounter an error condition, when for example the system may be incapable of performing an action responsive to a user input, or may be unsure of an appropriate action responsive to a user input. The system may also generate an error condition when a user inputs slight variations of expected or popular utterances. For example, a user may say or input text "Alexa, can you go to my Spotify?" The system may be unable to process this particular input, but is capable of processing "Alexa, go to Spotify" to start the Spotify application or skill.

Some of the skills systems may expect utterances or commands to be worded by a user in a particular form to provide a successful response. When interacting with the system, the users may experience an improved experience when the system is able to respond even when the user speaks an unexpected utterance, and/or an utterance that varies from an expected or preprogrammed utterance. In some situations the system may attempt to process the utterance, but may encounter an error condition. When the system encounters an error condition, it may output a message such as "I am sorry, but I am not sure how to respond," "I am sorry, but I do not understand," "I am not sure," or the like.

As a patentable improvement on handling such potential errors, a system may be configured to further engage a user in a dialog using its voice user interface prior to indicating the system is unable to perform an action responsive to a user input, is unsure of an appropriate action responsive to a user input, or otherwise indicate an error. For example, when the system might otherwise output content expressing response uncertainty, the system may instead generate synthesized speech that suggests an utterance to the user that has previously generated a successful response from the system. If the user confirms or agrees with the suggested utterance, then the system generates an output corresponding to the suggested utterance. In this manner the system can recover by using a conversational exchange between the user and the system, rather than simply returning an error. Such an approach may generate a more beneficial user experience.

The present disclosure improves such conversation recovery by determining an alternative text for the user input (utterance or text input) that is semantically similar and related to the user input. The alternative or suggested text data may be determined by searching and analyzing text data representing past utterances spoken by multiple users of the system. The system may also search and analyze a database that stores text representations of utterances generated by a system developer, for example a developer associated with a particular skill of the system (as described below). The system may use this data at runtime to generate a list of candidate text representations for the user input that may be potentially similar to an input utterance or input text data, and then further analyze the candidate text representations to determine a final alternative text that can be used in lieu of the input spoken utterance or entered text, thus providing the user with an output that is something other than an error indication. As discussed herein, an alternate utterance or alternative utterance may include alternative text that may correspond to an original user input (e.g., an initial spoken utterance), where the alternative text may correspond to a rephrasing of or other way of obtaining the result requested by the original user input.

In certain embodiments, the system may cause a question to be output to the user. The question may ask if the user meant the alternative utterance. For example, the user input may be "Alexa, what is my trivia question of the day?" After processing the input, the system may determine that an error condition exists. Instead of expressing response uncertainty, the system may query one or more databases to determine an alternative utterance, such as "What is the question of the day?" that the system can successfully respond to, and output "Do you mean 'What is the question of the day?'" If the user responds "Yes" or affirmatively, then the system may generate an output that corresponds to the skill or application associated with the intent of the alternative utterance.

A "skill" may be software running in a system that is akin to a software application running on a traditional computing device. That is, a skill may enable the system to execute specific functionality in order to provide data or produce some other requested output.

If the user responds affirmatively to the alternative utterance, the system may pass the user experience off to an appropriate component of the system (e.g., one that is configured to perform an action related to the utterance). If the user responds negatively, does not respond at all, or the system is unsure whether the user's response was affirmative or negative, the system may cease interaction with the user, thereby enabling the user to interact with the system as the user desires.

In another embodiment, the system may be configured to predict a false wake of the device. Depending on the likelihood of a false wake, the system may initiate a dialog with the user (when the false wake likelihood is low), fail silently (when false wake likelihood is high), or fail with a prompt (when false wake likelihood is between low and high).

The present disclosure has various benefits. One benefit is that the present disclosure provides a more beneficial user experience. This is due, at least in part, to the fact that the present disclosure's teachings decrease a frequency at which unresponsive actions are performed by a system. By decreasing the instances of such actions being performed, user/system interactions may be improved.

FIG. 1 illustrates a system configured to perform conversation recovery. Although the figures and discussion herein illustrate certain operational steps of the system in a particular order, the steps described may be performed in a different order (as well as certain steps removed or added) without departing from the intent of the disclosure. As illustrated in FIG. 1, the system may include one or more devices (110a/110b), local to a user 5, in communication with one or more systems 120 across one or more networks 199.

The device 110a may receive audio representing a user input spoken by the user 5. The device 110a may generate audio data representing the audio and send the audio data to the system(s) 120, which the system(s) 120 receives as first data representing a first user input (132). Alternatively, the device 110b may receive a text input representing a text-based user input from the user 5. The device 110b may generate text data representing the text input and may send the text data to the system(s) 120, which the system(s) 120 receives as first data representing a first user input (132). Depending on configuration, the device (110a/110b) may send audio data and/or text data to the system(s) 120 via a companion application installed on the device (110a/110b). The companion application may enable the device (110a/110b) to communicate with the system(s) 120 via the network(s) 199. An example of a companion application is the Amazon Alexa application that operates on a phone/tablet.

The system(s) 120 performs natural language processing on the received first data (134). If the system(s) 120 receives the user input as audio data, the system(s) 120 may perform ASR processing on the audio data to generate text data. The system(s) 120 may perform NLU processing on text data (e.g., either as received at step 132 or generated by the ASR processing) to generate one or more NLU hypotheses. An NLU hypothesis refers to an intent indicator (representing a potential intent of the user) and one or more corresponding slots (with each slot corresponding to a portion of the text data that corresponds to an entity known to the system).

The system(s) 120 may determine an error condition with the natural language processing (136). For example, the system may determine, based on the ASR processing and/or NLU processing, that an action cannot be performed, in response to the user input, with at least a threshold confidence. In other words, the system(s) 120 may determine the system(s) 120 cannot correctly respond to the user input. The system(s) 120's confidence in the ASR processing may not satisfy a threshold confidence, for example due to poor audio quality, user pronunciation errors, etc. In this case, the system(s) 120 may not understand the user input. Also or alternatively, none of the confidence values, associated with NLU hypotheses, may satisfy a threshold confidence. This may stem from poor ASR results (e.g., the system(s) 120 being unable to understand the user input), the system(s) 120 understanding the user input but the user input requesting something the system is not configured to do, etc. As a result of the system(s) 120 determining an error condition, for example, the system(s) 120 determining that the system(s) 120 cannot correctly respond to the user input, the system(s) 120 may generate an indicator representing an error message should be output to the user. An error message may indicate the system(s) 120 cannot understand the user input, may indicate the system(s) 120 understands the user input but cannot perform the requested action, etc.

After determining an action cannot be performed in response to the user input with at least a minimum confidence (i.e., after determining the error condition), in an example embodiment, the system(s) 120 may select (not shown in the figure) a particular conversation recovery technique. The system(s) 120 may be configured to perform various conversation recovery techniques including, but not limited to, asking the user to repeat the user input (e.g., when the ASR confidence is low); identifying the most highly scored NLU hypothesis (that nonetheless does not satisfy the threshold confidence) and asking the user whether the user wants the system(s) 120 to perform an action responsive to the NLU hypothesis; a topic switching technique; suggesting an alternative utterance, etc.

The system(s) may select suggesting an alternative utterance text for conversation recovery. The system(s) 120 may determine a list of candidate utterance text (140). For example, the system(s) 120 may query (138) an indexed dataset representing frequently spoken utterance data based on past utterances spoken by users of the systems. The system(s) 120 may also query (138) an indexed dataset representing utterance data generated by a system developer. Querying of the indexed datasets may be performed using an elastic search technique to determine a list of candidate utterances. The list of candidate utterance text may only include data representing utterances that the system(s) 120 has successfully processed or responded in the past.

The system(s) 120 may identify an alternative utterance text or a final utterance text from the list of candidate utterance text (142) to present to the user. For example, the system(s) 120 may filter and rank the list of candidate utterance text to determine the alternative utterance text. The system(s) 120 may filter the candidate utterance text using machine learning models and based on semantic similarity of the candidate utterance text with the user input. The system(s) 120 may further filter the candidate utterance text based on a comparison of certain data (entity type, parts-of-speech, etc.) related to the user input and that of the candidate utterance text. The system(s) 120 may then rank the filtered list of candidate utterances based on device type, domain information, intent information, and the like.

The system(s) 120 may generate output audio data based on the alternative utterance text (144). The output audio data may include at least a portion or the entire alternative utterance text, and may request a confirmation from the user to proceed with the alternative utterance text. For example, the user input received (132) by the system(s) 120 may be "Alexa, Can you connect to my Sirius radio?" The alternative utterance determined (142) by the system(s) 120 may be "play Sirius radio station." The output audio data generated (144) by the system(s) 120 may be "Do you want to play Sirius radio station?"

The system(s) 120 may receive (146) second data representing a second user input (spoken utterance or input text data) confirming the alternative utterance. The system(s) 120 may determine (using speech processing techniques) that the second data includes an affirmative response or confirmation (e.g., "yes," "okay," "that is right," etc.) from the user.

The system(s) 120 may then generate output data associated with an intent and/or slot data corresponding to the alternative utterance text (148). In an example embodiment, the system(s) 120 may store an intent corresponding to each candidate utterance text, and may retrieve the respective intent after the user confirms the alternative utterance text. The system(s) 120 may also store slot data corresponding to each candidate utterance text, and may retrieve the respective slot data after the user confirms the alternative utterance text. That is, the system(s) 120 may not perform NLU processing on the alternative utterance text to determine an intent and slot data; instead it retrieves a previously stored intent and/or slot data associated with the alternative utterance text. Based on the intent and/or the slot data the system(s) 120 may generate a response or output data. The system(s) 120 may send output data to a skill(s) system 225 corresponding to the intent to perform one or more actions responsive to the user input.

In some examples, the system(s) 120 may not ask the user 5 whether the user 5 wants the action to be performed. Instead, the system(s) 120 may simply output the information and perform the action without further user input. Whether the system(s) 120 performs the action without soliciting user input permitting same may be based on user preferences. For example, the user 5 may indicate to the system(s) 120 that, if the user 5 requests the information be output, that the system(s) 120 can thereafter perform the action as well without receiving further user input.

In at least some instances, the user 5 may not provide a second user input (received at step 146), or the user 5 may provide a second user input (received at step 146) that declines the alternative utterance, or the system(s) 120 may be unable to determine whether the second user input accepts or declines the alternative utterance. In such instances, the system(s) 120 may cease processing. This may close a dialog session between the user 5 and the system(s) 120, thereby enabling the user 5 to start a new dialog session with the system(s) 120 if the user 5 so desires.

As used herein, a "dialog," "dialog session," "session," or the like refers to various related user inputs and system outputs, for example inputs and outputs related to an ongoing exchange between a user and the system. When the system(s) 120 receives a user input, the system(s) 120 may associate the data (e.g., audio data or text data) representing the user input with a session identifier. The session identifier may be associated with various speech processing data (e.g., ASR results data, NLU results data, etc.) related to processing of the user input. When the system(s) 120 invokes a skill, the system(s) 120 may send the session identifier to the skill in addition to NLU results data. If the skill outputs data for presentment to the user, the skill may associate the data with the session identifier. The foregoing is illustrative and, thus, one skilled in the art will appreciate that a session identifier may be used to track data transmitted between various components of the system(s) 120.

A user input and performance of a corresponding action, responsive to the user input, may be referred to as a dialog "turn." A session identifier may be associated with multiple related turns corresponding to consecutive related user inputs. One user input may be considered related to a subsequent user input, thereby causing a single session identifier to be associated with both user inputs, based on, for example, a length of time between receipt of the first user input and receipt of the subsequent user input and/or a length of time between performance of an action responsive to the first user input and receipt of the subsequent user input.

The system may operate using various components as illustrated in FIG. 2A. The various components may be located on the same or different physical devices. Communication between various components may occur directly or across a network(s) 199.

An audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. An example wakeword is "Alexa."

Wakeword detection is typically performed without performing linguistic analysis, textual analysis, or semantic analysis. Instead, the audio data representing the audio 11 is analyzed to determine if specific characteristics of the audio data match preconfigured acoustic waveforms, audio signatures, or other data to determine if the audio data "matches" stored audio data corresponding to a wakeword.

The wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 211, representing the audio 11, to the system(s) 120. The audio data 211 may include data corresponding to the wakeword, or the portion of the audio data 211 corresponding to the wakeword may be removed by the device 110 prior to sending the audio data 211 to the system(s) 120.

Upon receipt by the system(s) 120, the audio data 211 may be sent to an orchestrator component 230. The orchestrator component 230 may include memory and logic that enables the orchestrator component 230 to transmit various pieces and forms of data to various components of the system(s) 120, as well as perform other operations as described herein.

The orchestrator component 230 may send the audio data 211 to an ASR component 250. The ASR component 250 transcribes the audio data 211 into text data. FIG. 2B illustrates example components of the ASR component 250. The ASR component 250 transcribes audio data into text data representing the words of the speech contained in the audio data. The text data may then be used by other components for various purposes, such as executing system commands, inputting data, etc. The ASR component 250 interprets the audio data 211 based on a similarity between the spoken user input and pre-established language models 254 stored in an ASR model storage 252. For example, the ASR component 250 may compare the audio data 211 with models for sounds (e.g., subword units or phonemes) and sequences of sounds to identify words that match the sequence of sounds spoken in the user input of the audio data 211. Alternatively, the ASR component 250 may use a finite state transducer (FST) 255 to implement the language model functions, as explained below.

The different ways a spoken user input may be interpreted (i.e., the different ASR hypotheses) may each be assigned a confidence value representing a likelihood that a particular set of words matches those spoken in the user input. The confidence value may be based on a number of factors including, for example, a similarity of the sound in the user input to models for language sounds (e.g., an acoustic model 253 stored in the ASR models storage 252), and a likelihood that a particular word that matches the sounds would be included in a sentence at the specific location (e.g., using a language or grammar model). Thus, each potential textual interpretation of the spoken user input (each potential ASR hypothesis) is associated with a confidence value. Based on the considered factors and the assigned confidence value, the ASR component 250 outputs the most likely text corresponding to the audio data 211. The ASR component 250 may also output multiple ASR hypotheses in the form of an N-best list, with each ASR hypothesis being associated with a respective confidence value.

The ASR component 250 may include an acoustic front end (AFE) 256 and speech recognition engine 258. The AFE 256 transforms the audio data 211 into data for processing by the speech recognition engine 258. The speech recognition engine 258 compares data (received from the AFE 256) with acoustic models 253, language models 254, FST 255, and/or other data models and information for recognizing the speech represented in the audio data 211. The AFE 256 may reduce noise in the audio data 211 and divide the digitized audio data into frames representing time intervals for which the AFE 256 determines a number of values, called features, representing the qualities of the audio data, along with a set of those values, called a feature vector, representing the features/qualities of the audio data within the frame. Typically, audio frames may be 10 ms each. Many different features may be determined, as known in the art, and each feature represents some quality of the audio that may be useful for ASR processing. A number of approaches may be used by the AFE 256 to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 258 may process the AFE 256's output with reference to information stored in the ASR model storage 252. Alternatively, post front-end processed data (such as feature vectors) may be received by the speech recognition engine 258 from another source besides the AFE 256. For example, the device 110 may process audio data into feature vectors (for example using an on-device AFE) and transmit that information to the system(s) 120 across the network(s) 199. The feature vectors may arrive at the system(s) 120 encoded, in which case they may be decoded prior to processing by the speech recognition engine 258.

The speech recognition engine 258 attempts to match received feature vectors to language phonemes and words as known in the stored acoustic models 253, language models 254, and FST(s) 255. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR processing will output one or more ASR hypotheses that make sense grammatically. The specific models used may be general models or may be models corresponding to a particular domain, such as music, banking, etc.

The speech recognition engine 258 may use a number of techniques to match feature vectors to phonemes or other phonetic units, such as biphones, triphones, etc. One common technique is using Hidden Markov Models (HMMs). HMMs are used to determine probabilities that feature vectors may match phonemes. Using HMMs, a number of states are presented, in which the states together represent a potential phoneme (or other speech unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMI and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 258, the state may change or stay the same, based on the processing of the new feature vectors. A Viterbi algorithm may be used to find the most likely sequence of states based on the processed feature vectors.

Probabilities and states may be calculated using a number of techniques. For example, probabilities for each state may be calculated using a Gaussian model, Gaussian mixture model, or other technique based on the feature vectors. Techniques such as maximum likelihood estimation (MLE) may be used to estimate the probability of phoneme states.

In addition to calculating potential states for one phoneme as a potential match to a feature vector, the speech recognition engine 258 may also calculate potential states for other phonemes. In this manner multiple states and state transition probabilities may be calculated.

The probable states and probable state transitions calculated by the speech recognition engine 258 are formed into paths. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. When combining scores as part of the ASR processing, scores may be multiplied together (or combined in other ways) to reach a desired combined score or probabilities may be converted to the log domain and added to assist processing.

The speech recognition engine 258 may also compute scores of branches of the paths based on language models or grammars. Language modeling involves determining scores for what words are likely to be used together to form coherent words and sentences. Application of a language model may improve the likelihood that the ASR component 250 correctly interprets the speech contained in the audio data. For example, acoustic model processing returning the potential phoneme paths of "B A T", "B A D", and "B E D" may be adjusted by a language model to adjust the recognition scores of "B A T" (interpreted as the word "bat"), "B A D" (interpreted as the word "bad"), and "B E D" (interpreted as the word "bed") based on the language context of each word within the spoken user input. The language modeling may be determined from a text corpus and may be customized for particular applications.

As the speech recognition engine 258 determines potential words from the audio, the lattice may become very large as many potential sounds and words are considered as potential matches for the audio. The potential matches may be illustrated as a word result network representing possible sequences of words that may be recognized and the likelihood of each sequence.

The text data output by the ASR component 250 represents one or more than one (e.g., in the form of an N-best list) ASR hypotheses representing speech represented in the audio data 211. The ASR component 250 may output text data that includes a top scoring ASR hypothesis or may include an N-best list including multiple ASR hypotheses.

In certain situations, the ASR component 250 may not be confident in the ASR processing. For example, the processed audio data may have a noise level that renders the speech difficult to understand by the ASR component 250. Such situation may be represented by a top scoring ASR hypothesis failing to satisfy a condition (e.g., a threshold confidence). Such situation may be considered an error condition herein.

Referring back to FIG. 2A, the device 110 may send text data 213 to the system(s) 120. Upon receipt by the system(s) 120, the text data 213 may be sent to the orchestrator component 230. The orchestrator component 230 may send text data (e.g., text data output by the ASR component 250 or the received text data 213) to the NLU component 260.

Figure 2C:
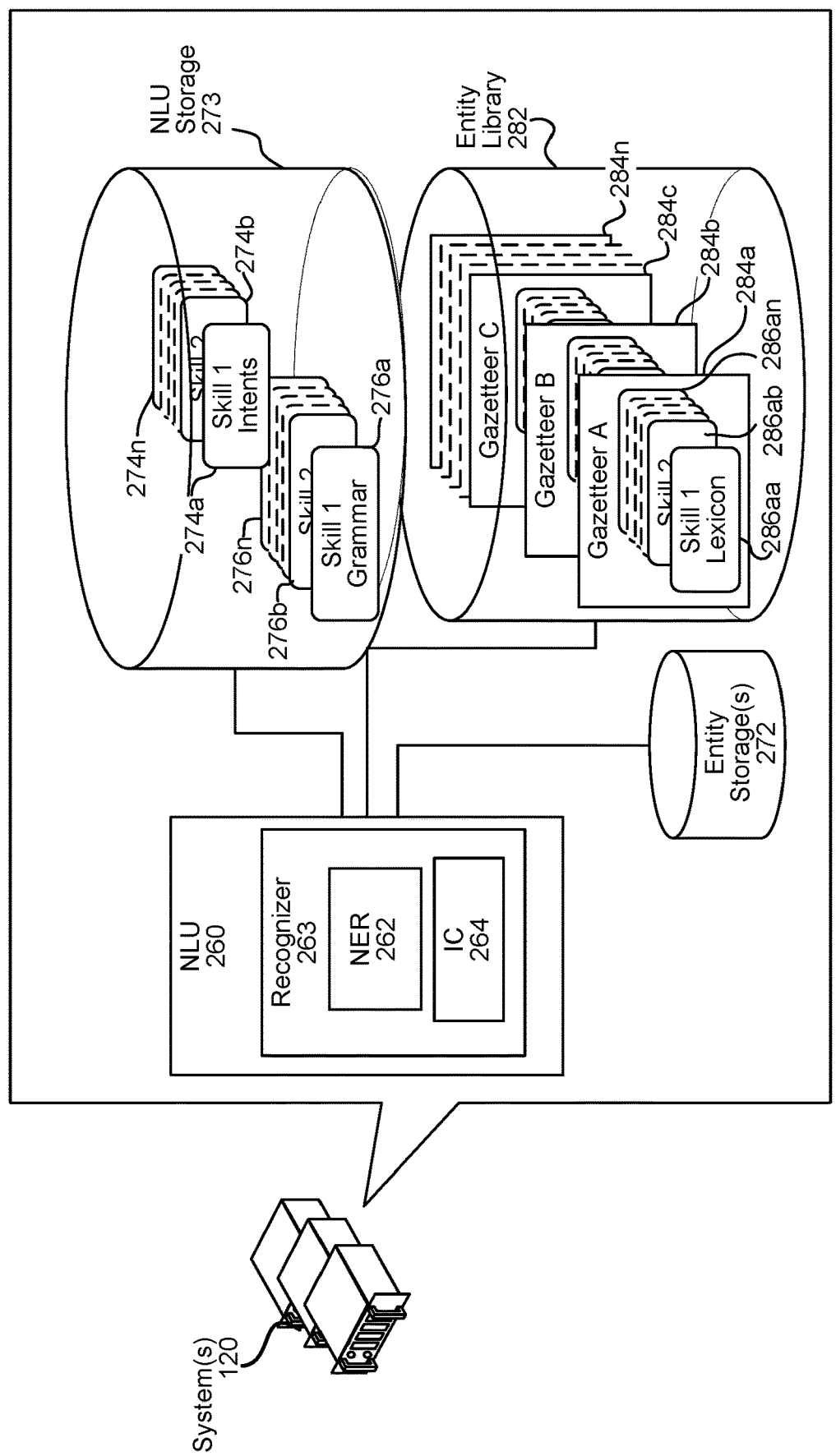
FIG. 2C is a conceptual diagram of how natural language understanding processing may be performed according to embodiments of the present disclosure.

FIG. 2C illustrates how NLU processing may be performed on the text data. Generally, the NLU component 260 attempts to make a semantic interpretation of text data input thereto. That is, the NLU component 260 determines the meaning behind text data based on the individual words and/or phrases represented therein. The NLU component 260 interprets text data to derive an intent of the user as well as pieces of the text data that allow a device (e.g., the device 110, the system(s) 120, a skill system(s) 225, etc.) to perform that intent. For example, if the NLU component 260 receives text data corresponding to "tell me the weather," the NLU component 260 may determine that the user intends the system to output weather information.

The NLU component 260 may process text data corresponding to several ASR hypotheses. For example, if the ASR component 250 outputs text data including an N-best list of ASR hypotheses, the NLU component 260 may process the text data with respect to all (or a portion of) the ASR hypotheses represented therein. Even though the ASR component 250 may output an N-best list of ASR hypotheses, the NLU component 260 may be configured to only process with respect to one or more top scoring ASR hypothesis in the N-best list.

The NLU component 260 may annotate text data by parsing and/or tagging the text data. For example, for the text data "tell me the weather for Seattle," the NLU component 260 may tag "Seattle" as a location for the weather information.

The NLU component 260 may include one or more recognizers 263. Each recognizer 263 may be associated with a different skill 290. Each recognizer 263 may process with respect to text data input to the NLU component 260. Each recognizer 263 may operate at least partially in parallel with other recognizers 263 of the NLU component 260.

Each recognizer 263 may include a named entity recognition (NER) component 262. The NER component 262 attempts to identify grammars and lexical information that may be used to construe meaning with respect to text data input therein. The NER component 262 identifies portions of text data that correspond to a named entity that may be applicable to processing performed by a skill 290, associated with the recognizer 263 implementing the NER component 262. The NER component 262 (or other component of the NLU component 260) may also determine whether a word refers to an entity whose identity is not explicitly mentioned in the text data, for example "him," "her," "it" or other anaphora, exophora, or the like.

Each recognizer 263, and more specifically each NER component 262, may be associated with a particular grammar model and/or database 273, a particular set of intents/actions 274, and a particular personalized lexicon 286. Each gazetteer 284 may include skill-indexed lexical information associated with a particular user and/or device 110. For example, a Gazetteer A (284a) includes skill-indexed lexical information 286aa to 286an. A user's music skill lexical information might include album titles, artist names, and song names, for example, whereas a user's contact list skill lexical information might include the names of contacts. Since every user's music collection and contact list is presumably different. This personalized information improves later performed entity resolution.

An NER component 262 applies grammar models 276 and lexical information 286 associated with the skill 290 (associated with the recognizer 263 implementing the NER component 262) to determine a mention of one or more entities in text data. In this manner, the NER component 262 identifies "slots" (each corresponding to one or more particular words in text data) that may be useful for later processing. The NER component 262 may also label each slot with a type (e.g., noun, place, city, artist name, song name, etc.).

Each grammar model 276 includes the names of entities (i.e., nouns) commonly found in speech about the particular skill 290 to which the grammar model 276 relates, whereas the lexical information 286 is personalized to the user and/or the device 110 from which the user input originated. For example, a grammar model 276 associated with a shopping skill may include a database of words commonly used when people discuss shopping.

A downstream process called entity resolution (discussed in detail elsewhere herein) links a slot of text data to a specific entity known to the system. To perform entity resolution, the NLU component 260 may utilize gazetteer information (284a-284n) stored in an entity library storage 282. The gazetteer information 284 may be used to match text data (representing a portion of the user input) with text data representing known entities, such as song titles, contact names, etc. Gazetteers 284 may be linked to users (e.g., a particular gazetteer may be associated with a specific user's music collection), may be linked to certain skills 290 (e.g., a shopping skill, a music skill, a video skill, etc.), or may be organized in a variety of other ways.

Each recognizer 263 may also include an intent classification (IC) component 264. An IC component 264 parses text data to determine an intent(s) (associated with the skill 290 associated with the recognizer 263 implementing the IC component 264) that potentially represents the user input. An intent represents to an action a user desires be performed. An IC component 264 may communicate with a database 274 of words linked to intents. For example, a music intent database may link words and phrases such as "quiet," "volume off," and "mute" to a <Mute> intent. An IC component 264 identifies potential intents by comparing words and phrases in text data (representing at least a portion of the user input) to the words and phrases in an intents database 274 (associated with the skill 290 that is associated with the recognizer 263 implementing the IC component 264).

The intents identifiable by a specific IC component 264 are linked to skill-specific (i.e., the skill 290 associated with the recognizer 263 implementing the IC component 264) grammar frameworks 276 with "slots" to be filled. Each slot of a grammar framework 276 corresponds to a portion of text data that the system believes corresponds to an entity. For example, a grammar framework 276 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 276 may not be structured as sentences, but rather based on associating slots with grammatical tags.

For example, an NER component 262 may parse text data to identify words as subject, object, verb, preposition, etc. based on grammar rules and/or models prior to recognizing named entities in the text data. An IC component 264 (implemented by the same recognizer 263 as the NER component 262) may use the identified verb to identify an intent. The NER component 262 may then determine a grammar model 276 associated with the identified intent. For example, a grammar model 276 for an intent corresponding to <PlayMusic> may specify a list of slots applicable to play the identified "object" and any object modifier (e.g., a prepositional phrase), such as {Artist Name}, {Album Name}, {Song name}, etc. The NER component 262 may then search corresponding fields in a lexicon 286 (associated with the skill 290 associated with the recognizer 263 implementing the NER component 262), attempting to match words and phrases in text data the NER component 262 previously tagged as a grammatical object or object modifier with those identified in the lexicon 286.

An NER component 262 may perform semantic tagging, which is the labeling of a word or combination of words according to their type/semantic meaning. An NER component 262 may parse text data using heuristic grammar rules, or a model may be constructed using techniques such as Hidden Markov Models, maximum entropy models, log linear models, conditional random fields (CRF), and the like. For example, an NER component 262 implemented by a music skill recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 262 identifies "Play" as a verb based on a word database associated with the music skill, which an IC component 264 (also implemented by the music skill recognizer) may determine corresponds to a <PlayMusic> intent. At this stage, no determination has been made as to the meaning of "mother's little helper" or "the rolling stones," but based on grammar rules and models, the NER component 262 has determined the text of these phrases relates to the grammatical object (i.e., entity) of the user input represented in the text data.

An NER component 262 may tag text data to attribute meaning thereto. For example, an NER component 262 may tag "play mother's little helper by the rolling stones" as: {skill} Music, {intent}<PlayMusic>, {artist name} rolling stones, {media type} SONG, and {song title} mother's little helper. For further example, the NER component 262 may tag "play songs by the rolling stones" as: {skill} Music, {intent}<PlayMusic>, {artist name} rolling stones, and {media type} SONG.

Figure 2D:
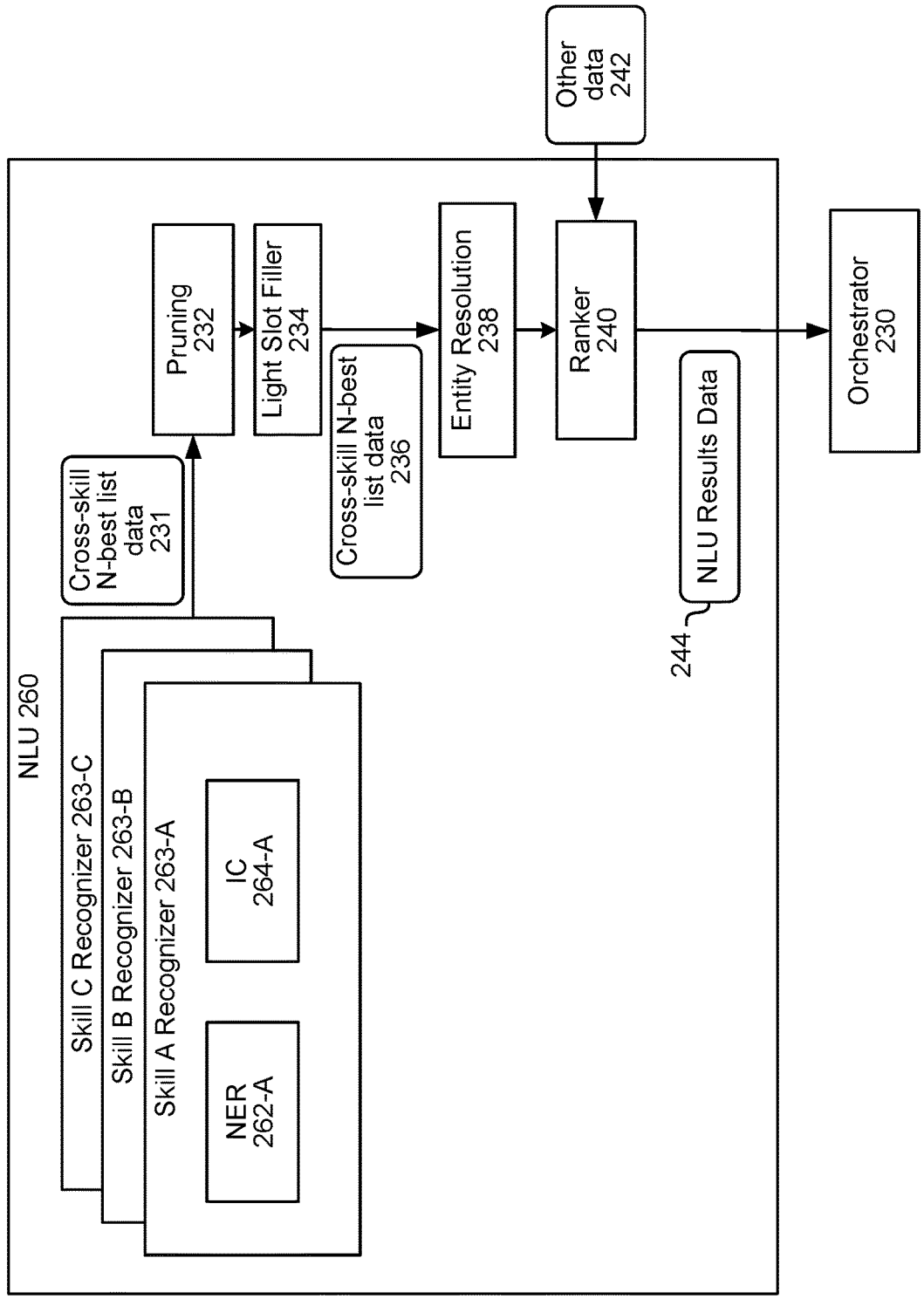
FIG. 2D is a conceptual diagram of how natural language understanding processing may be performed according to embodiments of the present disclosure.

The NLU component 260 may generate cross-skill N-best list data 231, which may include a list of NLU hypotheses output by each recognizer 263 (as illustrated in FIG. 2D). A recognizer 263 may output tagged text data generated by an NER component 262 and an IC component 264 operated by the recognizer 263, as described above. Each NLU hypothesis, including an intent indicator and text/slots identified by the NER component 262, may be grouped as an NLU hypothesis represented in the cross-skill N-best list data 231. Each NLU hypothesis may also be associated with a value representing the NLU component's confidence in the NLU hypothesis. For example, the cross-skill N-best list data 540 may be represented as, with each line representing a separate NLU hypothesis:

[0.95] Intent: <PlayMusic> ArtistName: Lady Gaga SongName: Poker Face

[0.95] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface

The NLU component 260 may send the cross-skill N-best list data 231 to a pruning component 232. The pruning component 232 may sort the NLU hypotheses represented in the cross-skill N-best list data 231 according to their respective scores. The pruning component 232 may then perform value thresholding with respect to the cross-skill N-best list data 231. For example, the pruning component 232 may select NLU hypotheses represented in the cross-skill N-best list data 231 associated with confidence values satisfying (e.g., meeting and/or exceeding) a threshold confidence value. The pruning component 232 may also or alternatively perform number of NLU hypothesis thresholding. For example, the pruning component 232 may select a maximum threshold number of top scoring NLU hypotheses. The pruning component 232 may generate cross-skill N-best list data 236 including the selected NLU hypotheses. The purpose of the pruning component 232 is to create a reduced list of NLU hypotheses so that downstream, more resource intensive, processes may only operate on the NLU hypotheses that most likely represent the user's intent.

The NLU component 260 may also include a light slot filler component 234. The light slot filler component 234 can take text data from slots, represented in the NLU hypotheses output by the pruning component 232, and alter it to make the text data more easily processed by downstream components. The light slot filler component 234 may perform low latency operations that do not involve heavy operations such as reference to one or more entity storages. The purpose of the light slot filler component 234 is to replace words with other words or values that may be more easily understood by downstream system components. For example, if an NLU hypothesis includes the word "tomorrow," the light slot filler component 234 may replace the word "tomorrow" with an actual date for purposes of downstream processing. Similarly, the light slot filler component 552 may replace the word "CD" with "album" or the words "compact disc." The replaced words are then included in the cross-skill N-best list data 236.

The NLU component 260 sends the cross-skill N-best list data 236 to an entity resolution component 238. The entity resolution component 238 can apply rules or other instructions to standardize labels or tokens from previous stages into an intent/slot representation. The precise transformation may depend on the skill 290. For example, for a travel skill, the entity resolution component 238 may transform text data corresponding to "Boston airport" to the standard BOS three-letter code referring to the airport. The entity resolution component 238 can refer to an entity storage(s) (including text data representing entities known to the system) to resolve the precise entity referred to in each slot of each NLU hypothesis represented in the cross-skill N-best list data 236. Specific intent/slot combinations may also be tied to a particular source, which may then be used to resolve the text data. In the example "play songs by the stones," the entity resolution component 238 may reference a personal music catalog, Amazon Music account, user profile data, or the like. The entity resolution component 238 may output text data including an altered N-best list that is based on the cross-skill N-best list data 236, and that includes more detailed information (e.g., entity IDs) about the specific entities mentioned in the slots and/or more detailed slot data that can eventually be used by a skill 290. The NLU component 260 may include multiple entity resolution components 238 and each entity resolution component 238 may be associated with one or more particular skills 290.

The entity resolution component 238 may use frameworks linked to the intent to determine what database fields should be searched to determine the meaning of tagged entities, such as searching a user's gazetteer 284 for similarity with the framework slots. For example, a framework for a <PlayMusic> intent might indicate to attempt to resolve an identified object based on {Artist Name}, {Album Name}, and {Song name}, and another framework for the same intent might indicate to attempt to resolve an object modifier based on {Artist Name}, and resolve the object based on {Album Name} and {Song Name} linked to an identified {Artist Name}. If the search of the gazetteer 284 does not resolve a slot/field using gazetteer information, the entity resolution component 238 may search a database of generic words associated with the skill 290 (in the entity storage(s) 272). For example, if the text data includes "play songs by the rolling stones," after failing to determine an album name or song name called "songs" by "the rolling stones," the entity resolution component 238 may search the skill vocabulary for the word "songs." In the alternative, generic words may be checked before the gazetteer information, or both may be tried, potentially producing two different results.

The entity resolution component 238 may not be successful in resolving every entity and filling every slot represented in the cross-skill N-best list data 236. This may result in the entity resolution component 238 outputting incomplete results.

The NLU component 260 may include a ranker component 240. The ranker component 240 may assign a particular confidence value to each NLU hypothesis input therein. The confidence value of an NLU hypothesis may represent a confidence of the system in the NLU processing performed with respect to the NLU hypothesis. The confidence value of a particular NLU hypothesis may be affected by whether the NLU hypothesis has unfilled slots. For example, if an NLU hypothesis associated with a first skill component includes slots that are all filled/resolved, that NLU hypothesis may be assigned a higher confidence value than another NLU hypothesis including at least some slots that are unfilled/unresolved by the entity resolution component 238.

The ranker component 240 may apply re-scoring, biasing, or other techniques to determine the top scoring NLU hypotheses. To do so, the ranker component 240 may consider not only the data output by the entity resolution component 238, but may also consider other data 242. The other data 242 may include a variety of information. The other data 242 may include skill rating or popularity data. For example, if one skill 290 has a particularly high rating, the ranker component 240 may increase the confidence value of an NLU hypothesis associated with that skill 290. The other data 242 may also include information about skills 290 that have been enabled for the user identifier and/or device identifier associated with the current user input. For example, the ranker component 240 may assign higher confidence values to NLU hypotheses associated with enabled skills 290 than NLU hypotheses associated with non-enabled skills 290. The other data 242 may also include data indicating user usage history, such as if the user identifier associated with the current user input is regularly associated with user input that invokes a particular skill 290 or does so at particular times of day. The other data 242 may additionally include data indicating date, time, location, weather, type of device 110, user identifier, device identifier, context, as well as other information. For example, the ranker component 240 may consider when any particular skill 290 is currently active (e.g., music being played, a game being played, etc.) with respect to the user or device associated with the current user input. The other data 242 may also include device type information. For example, if the device 110 does not include a display, the ranker component 240 may decrease the confidence values associated with NLU hypotheses that would result in displayable content being output by the system.

Following ranking by the ranker component 240, the NLU component 260 may output NLU results data 244 to the orchestrator component 230. The NLU results data 244 may include multiple top scoring NLU hypotheses (e.g., in the form of an N-best list) as determined by the ranker component 240. Alternatively, the NLU results data 244 may include the top scoring NLU hypothesis as determined by the ranker component 240. The NLU results data 244 may be a rich data object representing intents and resolved entities.

If at least one NLU hypothesis (represented in the NLU results data 244) satisfies a condition (e.g., a threshold confidence), the orchestrator component 230 may send at least a portion of the NLU results data 244 to a skill 290, thereby invoking the skill 290 to perform an action responsive to the user input. If none of the NLU hypotheses (represented in the NLU results data 244) satisfies the condition, the NLU component 260 may not be confident enough in the NLU processing to justify sending the NLU results data 244 to a skill to execute with respect to an intent represented in the NLU results data 244. Such a situation may be considered an error condition.

A "skill" may be software running on the system(s) 120 that is akin to a software application running on a traditional computing device. That is, a skill component 290 may enable the system(s) 120 to execute specific functionality in order to provide data or produce some other requested output. The system(s) 120 may be configured with more than one skill 290. For example, a weather service skill may enable the system(s) 120 to output weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the system(s) 120, a skill 290 may be implemented at least partially by a skill system(s) 225. Such may enable a skill system(s) 225 to execute specific functionality in order to provide data or perform some other action requested by a user.

Types of skills include home automation skills (e.g., skills that enable a user to control home devices such as lights, door locks, cameras, thermostats, etc.), entertainment device skills (e.g., skills that enable a user to control entertainment devices such as smart televisions), music playback skills (e.g., skills that enable a user to control various music playback applications such as Spotify, Pandora, Amazon Prime Music, etc.) video skills, knowledge base skill (e.g., skill that enables a user to request information on a topic), flash briefing skills, as well as custom skills that are not associated with any pre-configured type of skill.

The system(s) 120 may be configured with a single skill 290 dedicated to interacting with more than one skill system 225. The system(s) 120 may be configured with a skill component 290 that communicates with more than one type of device (e.g., different types of home automation devices).

Unless expressly stated otherwise, reference to a skill, skill device, or skill component may include a skill 290 operated by the system(s) 120 and/or the skill system(s) 225. The functionality described herein as a skill may be referred to using many different terms, such as an action, bot, app, or the like.

As illustrated in FIG. 2A, the system(s) 120 may include a TTS component 280 that generates audio data (e.g., synthesized speech) from text data using one or more different methods. Text data input to the TTS component 280 may come from a skill 290, the orchestrator component 230, or another component of the system.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system(s) 120 may include profile storage 270. The profile storage 270 may include a variety of information related to individual users, groups of users, devices, etc. that interact with the system. A "profile" refers to a set of data associated with a user, device, etc. The data of a profile may include preferences specific to the user, device, etc.; input and output capabilities of the device; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices of the user.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device identifiers representing one or more devices associated with the group profile.

The profile storage 270 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household. Each device profile may include input/output capabilities of each device, and one or more capabilities performable by each device, and Internet connectivity information for each device, for example.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

The system(s) 120 may include a user recognition component 295 that recognizes one or more users associated with data input to the system(s) 120. The user recognition component 295 may take as input the audio data 211. The user recognition component 295 may perform user recognition by comparing speech characteristics in the audio data 211 to stored speech characteristics of users. The user recognition component 295 may also or alternatively perform user recognition by comparing biometric data (e.g., fingerprint data, iris data, etc.), received by the system(s) 120 in correlation with a user input, to stored biometric data of users. The user recognition component 295 may also or alternatively perform user recognition by comparing image data (e.g., including a representation of at least a feature of a user), received by the system(s) 120 in correlation with a user input, with stored image data including representations of features of different users. The user recognition component 295 may perform additional user recognition processes, including those known in the art. For a particular user input, the user recognition component 295 may perform processing with respect to stored data of users associated with the device 110 that captured the user input.

The user recognition component 295 determines whether a user input originated from a particular user. For example, the user recognition component 295 may generate a first value representing a likelihood that a user input originated from a first user, a second value representing a likelihood that the user input originated from a second user, etc. The user recognition component 295 may also determine an overall confidence regarding the accuracy of user recognition operations.

The user recognition component 295 may output a single user identifier corresponding to the most likely user that originated the user input. Alternatively, the user recognition component 295 may output multiple user identifiers (e.g., in the form of an N-best list) with respective values representing likelihoods of respective users originating the user input. The output of the user recognition component 295 may be used to inform NLU processing, processing performed by a skill 290, as well as processing performed by other components of the system(s) 120 and/or other systems.

The system(s) 120 may include frequent utterance data (FUD) storage 275. The FUD storage 275 may include data related to past utterances spoken by users of the system and/or frequently spoken utterances by users of the system. The FUD storage 275 may store past/frequent utterance text data from past one to two years. In some embodiments, the FUD storage 275 may also include data corresponding to the utterances, such as, device type, domain, intent, slot data, frequency of utterance, and the like. The FUD storage 275 may also include friction data corresponding to the utterances, such as, friction type, frequency of friction, friction rate, etc. As used herein, friction refers to when a user encounters an error condition when interacting with the system(s) 120. That is, the system(s) 120 is unable to generate a response, is uncertain about generating a response, is unable to understand the user input, etc. The friction type data may represent a type of friction encountered by the user, such as, user action required (e.g., buy a product/service to continue with the experience, etc.), user needs to perform prior setup (e.g., user wants to add an event but needs to perform/approve calendar integration with the device), and the like. The friction rate data may be indicated as a percentage representing the likelihood of the utterance being successfully processed. For example, some users may experience friction with respect to certain utterances while others users may not depending on their device type, location or user profile data. An utterance that may fail regardless of the device type, user location, user profile and/or other data, may have a friction rate of 100%, and the system(s) 120 may determine to generate alternative utterances to recover the conversation with the user.

The system(s) 120 may also include user-generated utterance data storage 277. The user-generated utterance data storage 277 may include utterances generated by a system developer (rather than utterances spoken by a user when interacting with the system), and may include variations of the utterances. The utterance data in the user-generated utterance data storage 277 may also include an intent and/or slot data for the respective utterances.

The system(s) 120 may include a conversation recovery component 285 configured to perform conversation recovery as described herein. The conversation recovery component 285 may be implemented as a skill, or may be implemented as a different component of the system(s) 120 (as illustrated).

The conversation recovery component 285 may be invoked to execute when the system(s) 120 is not confident regarding which skill 290 should be invoked to perform an action responsive to the user input. The orchestrator component 230 may determine a confidence value of a highest scoring ASR hypothesis does not satisfy a threshold confidence value and/or may determine a highest scoring NLU hypothesis does not satisfy a threshold confidence value. The system(s) 120 may include a question and answer (Q&A) skill that executes at least partially in parallel with the NLU component 260 to determine whether a user input corresponds to a question to be answered by the Q&A skill. The orchestrator component 230 may determine the Q&A skill has indicated the user input is not a question to be answered by the Q&A skill, while also determining that the NLU results data represents the user input is a question to be answered by the Q&A skill. If the orchestrator component 230 makes any of the foregoing determinations, the orchestrator component 230 may be configured to send the NLU results data to the conversation recovery component 285, and not a skill 290.

The conversation recovery component 285 may be configured to perform various conversation recovery techniques including, but not limited to, asking the user to repeat the user input (e.g., when the ASR confidence is low); identifying the most highly scored NLU hypothesis (that nonetheless does not satisfy the threshold confidence) and asking the user whether the user wants the system(s) 120 to perform an action responsive to the NLU hypothesis; a topic switching technique; suggesting an alternative utterance, etc.

In another example, the orchestrator component 230 may send NLU results data to a skill 290, but the skill 230 may determine it is not configured to perform an action responsive to the user input. An example includes a music skill being called to output a song but the music skill determining it does not have access to audio data corresponding to the song. The skill 230 may output an indicator representing such determination to the orchestrator component 230, and the orchestrator component 230 may then send the NLU results data to the conversation recovery component 285.

The system(s) 120 may include a false wake detection component 265. In another embodiment, the conversation recovery component 285 and the false wake detection component 265 may be configured to predict a false wake of the device 110. Depending on the likelihood of a false wake, the conversation recovery component 285 may initiate a dialog with the user (when the false wake likelihood is low), fail silently (when false wake likelihood is high), or fail with a prompt (when false wake likelihood is between low and high). In an example embodiment, the false wake detection component 265 may employ a machine trained model that predicts the likelihood of a user utterance to be false wake based on various data available to the conversation recovery component 285 at runtime. Some of the data includes data generated by the ASR component 250 and NLU component 260 such as latency metrics in ASR processing, NLU hypotheses, NLU confidence scores, latency metrics in NLU processing, and the like. The trained model may generate a confidence score that represents the likelihood of a false wake. The confidence score may be provided to the conversation recovery component 285 to determine if the system(s) 120 should output a conversation recovery experience, output other data, or output no data and fail silently.

Figure 3:
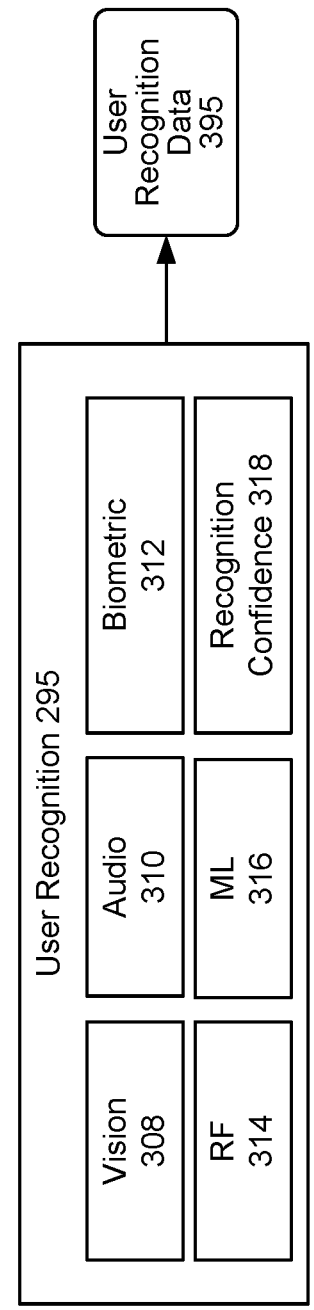
FIG. 3 is a conceptual diagram of an illustrative architecture in which sensor data is combined to recognize one or more users according to embodiments of the present disclosure.

As described herein, the system(s) 120 may include a user recognition component 295 that recognizes users that originate user inputs. As illustrated in FIG. 3, the user recognition component 295 may include one or more subcomponents including a vision component 308, an audio component 310, a biometric component 312, a radio frequency (RF) component 314, a machine learning (ML) component 316, and a recognition confidence component 318. In some instances, the user recognition component 295 may monitor data and determinations from one or more subcomponents to determine an identity of one or more users associated with data input to the system(s) 120. The user recognition component 295 may output user recognition data 395, which may include a user identifier associated with a user the user recognition component 295 believes originated a user input. The user recognition data 395 may be used to inform processes performed by the orchestrator component 230, the conversation recovery component 285, and/or other components of the system(s) 120.

The vision component 308 may receive data from one or more sensors capable of providing images (e.g., cameras) or sensors indicating motion (e.g., motion sensors). The vision component 308 can perform facial recognition or image analysis to determine an identity of a user and to associate that identity with a user identifier corresponding to the user. In some instances, when a user is facing a camera, the vision component 308 may perform facial recognition and identify the user with a high degree of confidence. In other instances, the vision component 308 may have a low degree of confidence of an identity of a user, and the user recognition component 295 may utilize determinations from additional components to determine an identity of a user. The vision component 308 can be used in conjunction with other components to determine an identity of a user. For example, the user recognition component 295 may use data from the vision component 308 with data from the audio component 310 to identify what user's face appears to be speaking at the same time audio is captured by a device 110 for purposes of identifying a user who spoke an input to the system(s) 120.

The system may include biometric sensors that transmit data to the biometric component 312. For example, the biometric component 312 may receive data corresponding to fingerprints, iris or retina scans, thermal scans, weights of users, a size of a user, pressure (e.g., within floor sensors), etc., and may determine a biometric profile corresponding to a user. The biometric component 312 may distinguish between a user and sound from a television, for example. Thus, the biometric component 312 may incorporate biometric information into a confidence level for determining an identity of a user. Biometric information output by the biometric component 312 can be associated with specific user identifier (and corresponding user profile).

The RF component 314 may use RF localization to track devices that a user may carry or wear. For example, a user (and more particularly a user profile associated with the user) may be associated with a device. The device may emit RF signals (e.g., Wi-Fi, Bluetooth®, etc.). A device may detect the signal and indicate to the RF component 314 the strength of the signal (e.g., as a received signal strength indication (RSSI)). The RF component 314 may use the RSSI to determine an identity of a user (with an associated confidence level). In some instances, the RF component 314 may determine that a received RF signal is associated with a mobile device that is associated with a particular user identifier.

In some instances, a device 110 may include some RF or other detection processing capabilities so that a user who speaks an input may scan, tap, or otherwise acknowledge his/her personal device (such as a phone) to the device 110. In this manner, the user may "register" with the system(s) 120 for purposes of the system(s) 120 determining who spoke a particular input. Such a registration may occur prior to, during, or after speaking of an input.

The ML component 316 may track the behavior of various users as a factor in determining a confidence level of the identity of the user. By way of example, a user may adhere to a regular schedule such that the user is at a particular location during the day (e.g., at work or at school). In this example, the ML component 316 would factor in past behavior and/or trends into determining the identity of the user that provided input to the system(s) 120. Thus, the ML component 316 may use historical data and/or usage patterns over time to increase or decrease a confidence level of an identity of a user.

In some instances, the recognition confidence component 318 receives determinations from the various components 308, 310, 312, 314, and/or 316, and may determine a final confidence level associated with the identity of a user. In some instances, the confidence level may determine whether an action is performed. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 395.

The audio component 310 may receive data from one or more sensors capable of providing an audio signal (e.g., one or more microphones) to facilitate recognition of a user. The audio component 310 may perform audio recognition on an audio signal to determine an identity of the user and associated user identifier. In some instances, aspects of the system(s) 120 may be configured at a computing device (e.g., a local server). Thus, in some instances, the audio component 310 operating on a computing device may analyze all sound to facilitate recognition of a user. In some instances, the audio component 310 may perform voice recognition to determine an identity of a user.

The audio component 310 may also perform user recognition based on audio data 211 input into the system(s) 120 for speech processing. The audio component 310 may determine scores indicating whether speech in the audio data 211 originated from particular users. For example, a first score may indicate a likelihood that speech in the audio data 211 originated from a first user associated with a first user identifier, a second score may indicate a likelihood that speech in the audio data 211 originated from a second user associated with a second user identifier, etc. The audio component 310 may perform user recognition by comparing speech characteristics, representing speech in the audio data 211, to stored speech characteristics of users (associated with the device 110 that captured the spoken user input).

Figure 4:
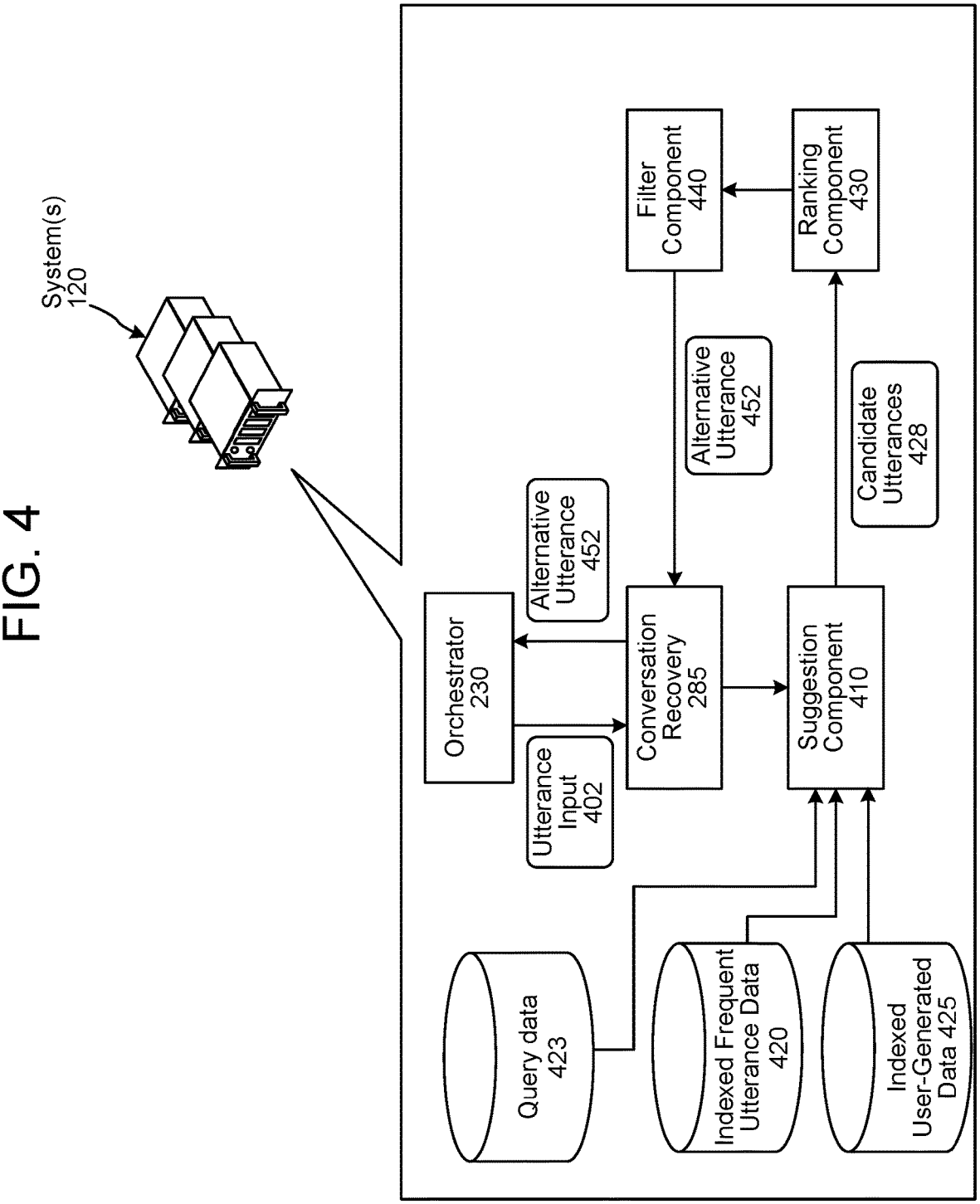
FIG. 4 is a conceptual diagram of the types of data and components a conversation recovery component may interact with when determining an alternative text for the utterance according to embodiments of the present disclosure.

FIG. 4 is a conceptual diagram of the types of data and components a conversation recovery component may interact with when determining an alternative utterance according to embodiments of the present disclosure. As illustrated in FIG. 4, the conversation recovery component 285 may interact with various components and may consider various data when determining an alternative utterance to suggest to the user. The components and data represented in FIG. 4 is illustrative. One skilled in the art will appreciate that other types of components or data may be considered by the conversation recovery component 285 when determining an alternative utterance.

As described herein, the orchestrator 230 may invoke the conversation recovery component 285 when an error condition is determined when processing the utterance input 402. The utterance input 402 may be derived from audio data 211 or text data 213. The utterance input 402 may be a result of ASR processing (e.g., by ASR component 250) and/or NLU processing (e.g., by NLU component 260). The conversation recovery component 285 may receive the utterance input 402 from the orchestrator 230.

The conversation recovery component 285 may provide the utterance input 402 to a suggestion component 410. The suggestion component 410 may be configured to generate a list of candidate text representations for an utterance from multiple sources. For example, the suggestion component 410 may perform an elastic search of indexed data. The indexed data may be stored in indexed frequent utterance data storage 420 and indexed user-generated data storage 425. The indexed frequent utterance data storage 420 may store indexed data of FUD storage 275. The FUD storage 275 may include text data representing past utterances spoken by users of the system and/or frequently spoken utterances by users of the system. The FUD storage 275 may store past/frequent utterance text data from past one to two years. In some embodiments, the FUD storage 275 may also include data corresponding to the utterances, such as, device type, domain, intent, frequency of utterance, and the like. The FUD storage 275 may also include friction data corresponding to the utterances, such as, friction type, frequency of friction, friction rate, etc. The indexed user-generated data storage 425 may store indexed data of user-generated utterance data storage 277. The user-generated utterance data storage 277 may include utterance text generated by a system developer (rather than utterances spoken by a user when interacting with the system), and may include variations of the utterance text.

The suggestion component 410 may perform a search of the indexed data, which at a high level includes, but not limited to, searching based on term/keyword frequency and inverse document frequency. The suggestion component 410 may be able to achieve fast search responses because, instead of searching the text data directly, it searches an index. As an explanatory analogy, the search performed by the suggestion component 410 is similar to retrieving pages in a book related to a keyword by scanning the index at the back of a book, as opposed to searching every word of every page of the book. This type of index may be called an inverted index because it inverts a page-centric data structure (page→words) to a keyword-centric data structure (word→pages).

The suggestion component 410 may also retrieve candidate utterance text from a query data storage 423. The query data storage 423 may store data representing mappings between certain user utterance inputs to actionable utterances that the system(s) 120 is capable of understanding and processing. The query data storage 423 may also store data related to system rewrites of certain user utterance inputs, where the system rewrites may be based on subsequent user input to reformulate or rephrase an initial utterance or query. The utterance data stored in the query data storage 423 may also store an intent and/or slot data for the respective utterances.

In an example embodiment, prior to searching, the utterance input 402 may be pre-processed. For example, the utterance input 402 may be filtered based on an utterance length (e.g., >=3-word count), word blacklist, subjective or opinionated utterance, and the like. The filtered utterance input may be used by the suggestion component 410 to perform a search of the indexed data storages.

Based on the results of searching the indexed data storages 420, 425, the suggestion component 410 may generate a list of candidate text representations for the utterance input 428. In an example embodiment, the list of candidate utterance text may include the top 10 search results from each indexed data storage 420, 425.

The various components illustrated in FIG. 4 may be configured to filter, narrow, and/or rank the list of candidate utterance text 428 to determine a final alternative utterance text 452 that is presented to the user. The list of candidate utterance text 428 may be provided to a ranking component 430. The ranking component 430 may employ machine learning (ML) techniques to narrow or rank the candidate utterances 428. For example, the ranking component 430, using ML techniques, may determine a score for each candidate utterance text based on its semantic similarity with the utterance input 402. Based on the score, the ranking component 430 may rank the list of candidate utterance text or filter/narrow the list of candidate utterance text by removing the candidate utterance text whose scores do not meet a threshold.

The ranking component 430 may implement one or more trained machine learning models. The machine learning model(s) may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, the machine learning processes themselves need to be trained. Training a machine learning component requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The ranking component 430 may also be configured to rank the remaining candidate utterance text based on their corresponding search index or corresponding indexed data storage that the candidate utterance was retrieved from. For example, candidate utterances that were based on search results from the indexed user-generated utterance data storage 425 may be ranked higher than the candidate utterances that were based on search results from the indexed FUD storage 420. The ranking component 430 may also rank the remaining candidate utterance text based on device type (the output resulting from the candidate utterance text matches the device type at which the utterance input 402 was received), domain (the domain associated with the candidate utterance text matches that of the utterance input), intent (the intent associated with the candidate utterance text matches that of the utterance input), and the like.

The ranking component 430 may provide the narrowed or ranked list of candidate utterance text to a filter component 440. The filter component 440 may be configured to further filter the list of candidate utterance text received from the ranking component 430. The filter component 440 may filter the candidate utterances based on an entity type comparison, where the filter component 440 filters/removes candidate utterances from the list if one or more entities in the candidate utterance does not match one or more entities in the utterance input 402. The filter component 440 may also filter the candidate utterances based on a part-of-speech comparison, where the filter component 440 filters/removes candidate utterance text from the list if the words in the candidate utterance text do not match the words in the utterance input 402 based on parts-of-speech (e.g., verb match, noun match, etc.). The filter component 440 may also filter the candidate utterance text based on other factors, such as comparison of domain information and intent information between the candidate utterance text and the utterance input 402.

The output of the filter component 440 may be a final alternative utterance text 452. After ranking the candidate utterance text as described above, the filtering component 440 may select the top candidate utterance text as the alternative utterance text 452 to be presented to the user. The alternative utterance text 452 may be provided to the conversation recovery component 285, which may then forward to the orchestrator 230 to generate output data. As described herein, the orchestrator 230 may generate output data based on the alternative utterance text 452, including, but not limited to, output audio/text data requesting a confirmation from the user to proceed with the alternative utterance text.

Although the narrowing, ranking, and/or filtering are illustrated as being performed in a certain order, it should be understood that these steps can be performed in another order to determine the alternative utterance text 452.

The conversation recovery component 285 may also consider user profile data (not shown) received from the profile storage 270 and/or system usage data (not shown) received from a system storage. The conversation recovery component 285 may query the profile storage 270 for user profile data associated with the user identifier, representing the user that originated the user input. The conversation recovery component 285 may also or alternatively query the system storage for system usage data associated with the user identifier. The user profile data or system usage data may include data representing past utterances spoken by the user. The conversation recovery component 285 may use this data to determine the list of candidate utterances or to filter/rank the candidate utterances to determine the alternative utterance.

Figure 5:
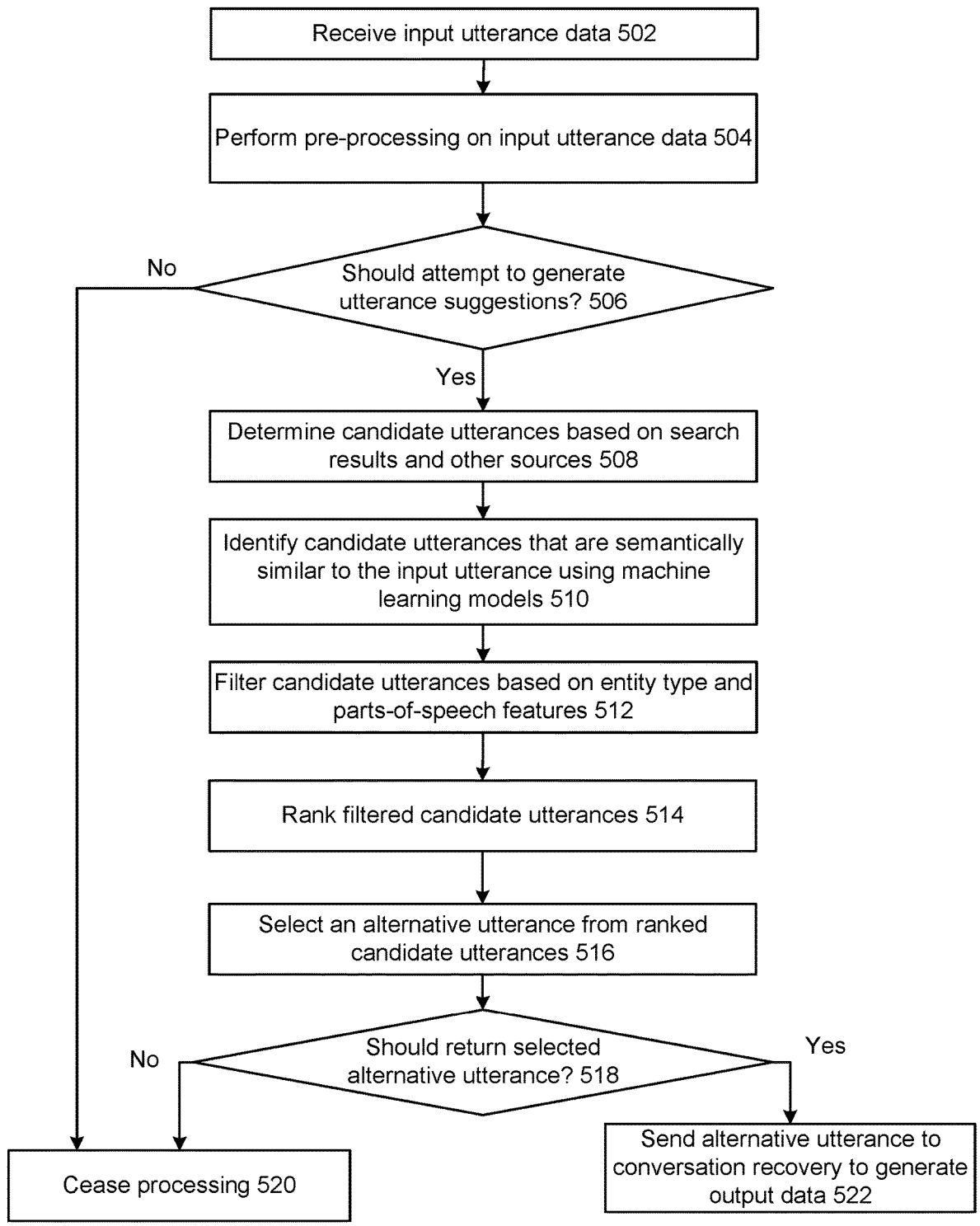
FIG. 5 is a process flow diagram illustrating a system determining an alternative text for the utterance according to embodiments of the present disclosure.

FIG. 5 is a process flow diagram illustrating a system determining an alternative utterance according to embodiments of the present disclosure. The process illustrated in FIG. 5 may be performed by the system(s) 120 via one or more components described in relation to FIGS. 2A and 4. As illustrated in FIG. 5, the system(s) 120 may receive input utterance data (502), and perform pre-processing on the input utterance data (504). At the pre-processing step, the system(s) 120 may filter the input utterance data based on length (>=3-word count), word blacklist, subjective or opinionated utterance (e.g., "I like <person>" or "I dislike <thing>"), etc.

The system(s) 120 may then determine if it should attempt to generate utterance suggestions (506). For example, the system(s) 120 may determine to not generate utterance suggestions for conversation recovery if the user utterance input includes few words (e.g., less than 3 words). As another example, the system(s) 120 may determine to not generate utterance suggestions if the user utterance input includes certain blacklisted words (e.g., profanity, opinions, etc.). As a further example, the system(s) 120 may determine to not generate utterance suggestions if the user utterance input includes certain commands, such as application control commands (e.g., music playback controls), numerical values, etc. If the system(s) 120 determines that it should not generate utterance suggestions to recover the conversation, then the system(s) 120 ceases processing (520) under the conversation recovery component. The system(s) 120 may generate the error condition associated with the user utterance input determined during ASR and/or NLU processing, or the system(s) 120 may fail silently without generating any output.

Figure 6:
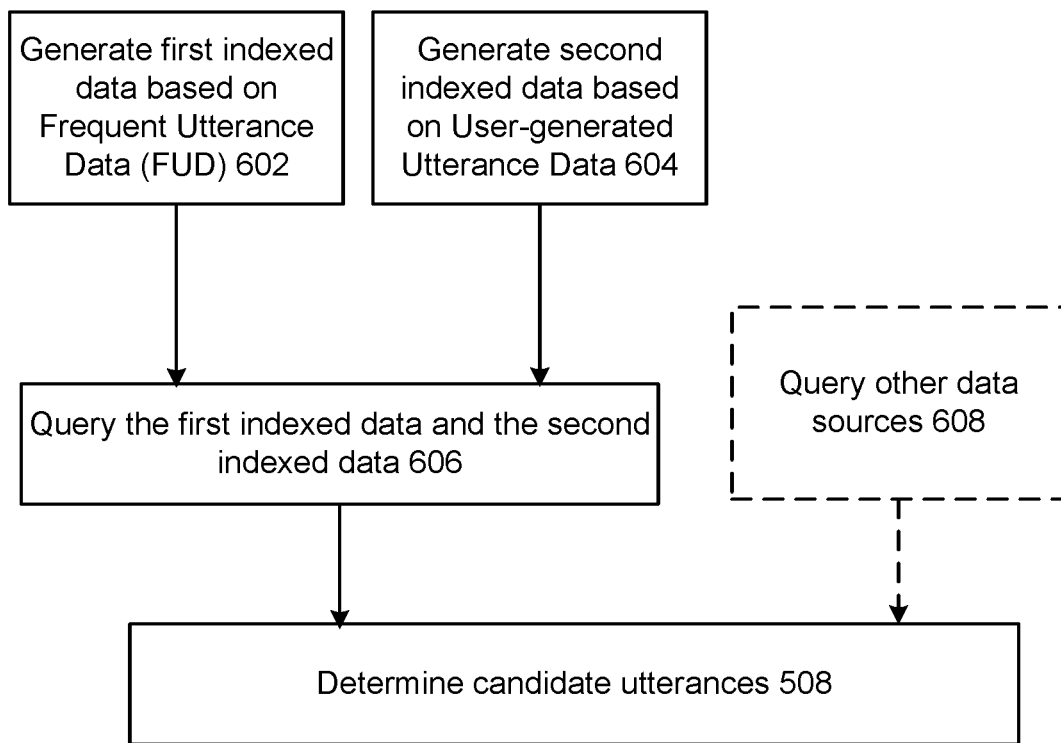
FIG. 6 is a process flow diagram illustrating how candidate text representations of an utterance are determined using indexed datasets according to embodiments of the present disclosure.

If the system(s) 120 determines that utterance suggestion should be generated, then the system(s) 120 determines candidate utterance text based on elastic search results and other sources (508). As described above in relation to FIG. 4, the system(s) 120 may perform a search of indexed data to determine a list of candidate utterance text. FIG. 6 illustrates a process for determining candidate utterance text using indexed datasets according to embodiments of the present disclosure.

Prior to invoking the conversation recovery component 258 (e.g., during setup), indexed data may be stored for use by the conversation recovery component 258 for determining alternative utterance text. As illustrated in FIG. 6, the first indexed data is generated (602) based on frequent utterance data (FUD) (e.g., stored in storage 275). The FUD may include data related to frequently spoken past utterances by multiple users of the system. The data may be based on past utterances spoken over a period of 1 to 2 years. The second indexed data is generated (604) based on user-generated utterance data (e.g., stored in storage 277). The user-generated utterance data may be data related to utterances generated by a system developer, and may include variations of the utterances. After the conversation recovery component 258 is invoked, the system(s) 120 may query or search the first indexed data and the second indexed data (606). The system(s) 120 may perform an elastic search as described in relation to FIG. 4. Based on the search results, the system(s) 120 may determine a first list of candidate utterance text (508).

The system(s) 120 may also determine candidate utterance text based on querying other data sources (608), such as query data storage 423. The other data sources may store data representing mappings between certain user utterance inputs to actionable utterance data that the system is capable of understanding and processing. The other data sources may also store data related to system rewrites of certain user utterance inputs, where the system rewrites may be based on subsequent user input to reformulate or rephrase an initial utterance or query.

Referring back to FIG. 5, the system(s) 120 may identify candidate utterance text (from the list determined in step 508) that are semantically similar to the input utterance data using one or more machine-learning models (510). The candidate utterance text identified in step 510 may be stored as a second list of candidate utterance text. The system(s) 120 may filter the list of candidate utterance text based on entity type and/or parts-of-speech features (512). At step 512, the system(s) 120 may filter the second list of candidate utterance text or the first list of candidate utterance text. The system(s) 120 may filter the candidate utterance text based on other factors, and may store the results as a third list of candidate utterance text.

The system(s) 120 may rank the filtered candidate utterance text (514). The system(s) 120 may rank the first, second or third list of candidate utterance text. The system(s) 120 may rank the candidate utterance text based on device type, domain type, intent, and other data related to the input utterance data. The system(s) 120 may also rank the candidate utterance text based on which indexed data storage it was retrieved from. The system(s) 120 may select an alternative utterance text from the ranked candidate utterances (516).

The system(s) 120 may determine whether the selected alternative utterance text should be returned to the conversation recovery component 258 for presentation to the user (518). For example, the system(s) 120 may perform a final check or verification of the selected alternative utterance text. The system(s) 120 may determine whether the alternative utterance text should be returned or not based on the intent associated with the alternative utterance text being the same as the intent associated with the user utterance input as determined by the NLU component 260. The system(s) may also determine whether the alternative utterance should be returned or not based on compatibility of the output associated with the alternative utterance text with the user device's capabilities (e.g., user's device only has audio output capabilities, user's device has audio and video capabilities, etc.) If the system(s) 120 determines that the alternative utterance text should not be returned, then the system(s) 120 ceases processing (520). The system(s) 120 may generate the error condition associated with the user utterance input determined during ASR and/or NLU processing, or the system(s) 120 may fail silently without generating any output. If the system(s) 120 determines that the alternative utterance text should be returned, then the system(s) 120 sends the alternative utterance text and related data to the conversation recovery component 258 to generate output data (522).

The system(s) 120 may generate output data in the form of an audio output via device 110 requesting confirmation from the user that the system(s) 120 should proceed with the alternative utterance text. In other embodiments, the system(s) 120 may retrieve the intent and/or slot data associated with the alternative utterance text and generate output data based on the intent and slot data.

In this manner, exemplary embodiments provide a system for recovering a conversation between a user and the system when the system is unable to properly respond to a user's input. The system may process the user input and determine an error condition exists. The system may query one or more storage systems to identify candidate utterance text based on their semantic similarity to the user input. The storage systems may store data related to past frequently spoken utterances and/or user-generated utterances. An alternative utterance text may be selected from the candidate utterances and presented to the user for confirmation.

Figure 7:
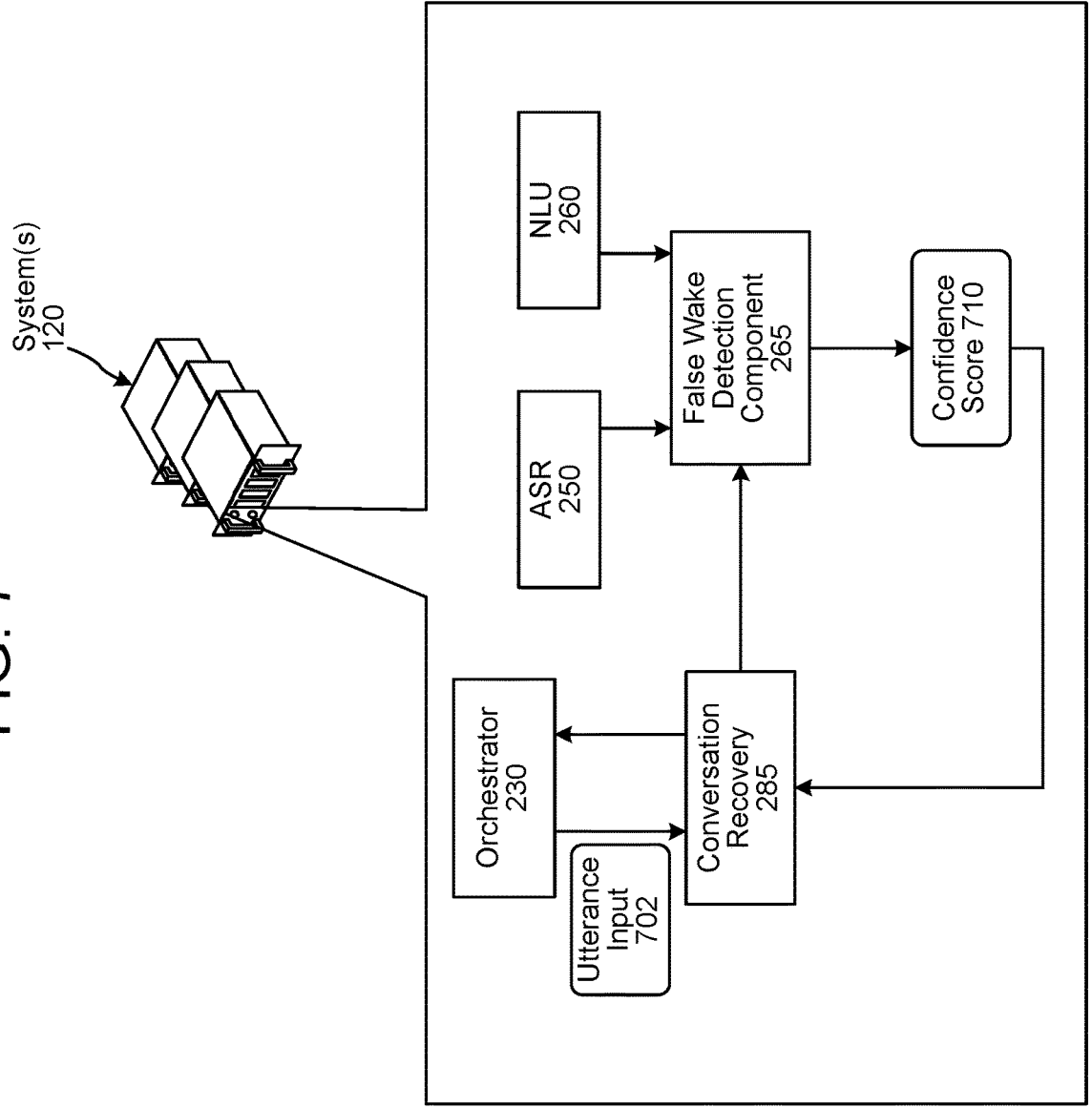
FIG. 7 is a conceptual diagram of the types of data and components a conversation recovery component may consider when determining a likelihood of false wake according to embodiments of the present disclosure.

In another embodiment, the conversation recovery component 285 and the false wake detection component 265 may be configured to predict a false wake of the device 110. Depending on the likelihood of a false wake, the conversation recovery component 285 may initiate a dialog with the user (when the false wake likelihood is low), fail silently (when false wake likelihood is high), or fail with a prompt (when false wake likelihood is between low and high). FIG. 7 is a conceptual diagram of the types of data and components a conversation recovery component may consider when determining a likelihood of false wake according to embodiments of the present disclosure. The false wake detection component 265 may employ a machine trained model that predicts the likelihood of a user utterance (702) to be false wake based on various data available to the conversation recovery component 285 at runtime. Some of the data includes data generated by the ASR component 250 and NLU component 260 such as latency metrics in ASR processing, NLU hypotheses, NLU confidence scores, latency metrics in NLU processing, and the like. The trained model may generate a confidence score 710 that represents the likelihood of a false wake. The confidence score 710 may be provided to the conversation recovery component 285 to determine if the system(s) 120 should output a conversation recovery experience, output other data, or output no data and fail silently.

The false wake detection component 265 may determine the confidence score 710 based on an ASR directedness score. The ASR directedness score may be generated by the ASR component 250 and may indicate whether a user is still conversing with the device 110. The ASR directedness score may be generated by the ASR component 250 for each utterance received at the device 110, where the ASR directedness score represents the likelihood that a user is directing speech to the device 110. The false wake detection component 265 may determine the confidence score 710 based on an ASR token score generated by the ASR component 250. The ASR token score may be generated for the first wakeword within the utterance stream, the ASR token score may be a score generated by the ASR component 250 for each word in the utterance. The false wake detection component 265 may determine the confidence score 710 based on a number of ASR active nodes. The number of ASR active nodes may refer to the number of active nodes in the decode graph per frame of audio delivered to the decoder. The false wake detection component 265 may also determine the confidence score 710 based on the processing latency of the ASR component when processing the utterance input.

The false wake detection component 265 may determine the confidence score 710 based on an NLU top interpretation confidence score, which may be generated by the NLU component 260. The NLU top interpretation confidence score may be the difference between the score of the top (the best, the first) NLU hypothesis and the score of the next (the second best, the second) NLU hypothesis. The false wake detection component 265 may determine the confidence score 710 based on an NLU interpretation count generated by the NLU component 260. The NLU interpretation count may be the number of total hypotheses generated by the NLU component 260 for the input utterance.

The false wake detection component 265 may also determine the confidence score 710 based on data related to the audio input associated with the utterance input. For example, the false wake detection component 265 may determine the confidence score 710 based on the audio length (for example, in milliseconds) and/or an audio initiator (for example, a TTS prompt, a short button press, a wake word, or an attention span/follow-up mode). The false wake detection component 265 may determine the confidence score 710 based on an audio stream index (which may refer to the number of different utterances in an audio stream), a dialog status, which may be assigned by the system(s) 120 as user abandoned, device abandoned, in progress or successful, and/or a dialog state (which may refer to the action or output generated by the device 110).

The various data described above that may be used by the false wake detection component 265 may be inputted into a trained machine learning model to determine the confidence score 710.

Figure 8:
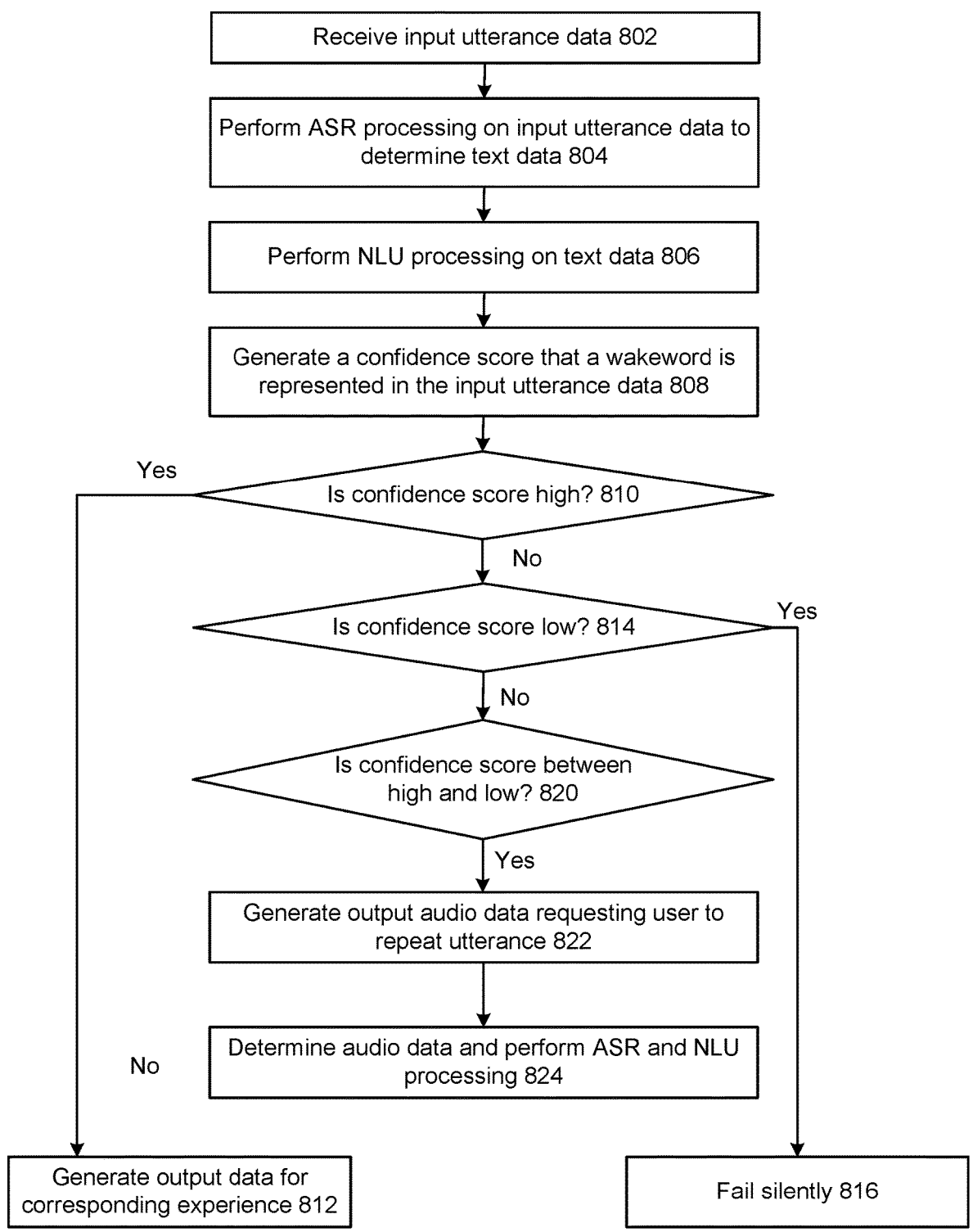
FIG. 8 is a process flow diagram illustrating a system determining a likelihood of false wake according to embodiments of the present disclosure.

FIG. 8 is a process flow diagram illustrating a system determining a likelihood of false wake according to embodiments of the present disclosure. The system(s) 120 may receive input utterance data (802). The system(s) 120 may perform ASR processing on the input utterance data to determine text data (804). The ASR processing may be performed by the ASR component 250 as described above. The system(s) 120 may perform NLU processing on the text data (806). The NLU processing may be performed by the NLU component 260 as described above. The system(s) 120 may then generate a confidence score that a wakeword is represented in the input utterance data (808). The system(s) 120 may use one or more trained machine learning models to determine the confidence score based on various data inputs (for example, data generated by the ASR component 250, data generated by the NLU component 260, data related to the audio input, and other data available to the conversation recovery component 285).

If the confidence score is high or above a high threshold value (810), indicating that the likelihood of a false wake is low (in other words the user intended to wake the device), the system(s) 120 may generate output data based on the input utterance data (812). In an example embodiment, if the confidence score is low or is below a low threshold value (814), indicating that the likelihood of a false wake is high, then the system(s) 120 may fail silently (816), since the user did not intend to wake the device.

If the confidence score is between high and low (820) or is within a medium threshold value (in other words the user may or may not have intended to wake the device), then the system(s) 120 may output audio data to receive confirmation from the user that he or she intended to wake the device (822). The system(s) 120 may output audio data requesting the user to repeat his or her previous utterance (822). In response, the system(s) 120 may receive a subsequent utterance from the user. The system(s) 120 may process the subsequent utterance as a new user input as described in connection with FIG. 2A. That is, the system(s) 120 may determine audio data associated with the subsequent utterance and perform ASR and NLU processing (824), which may result in better ASR and NLU processing results and the system(s) 120 avoiding an error condition.

In an example embodiment, the system(s) 120 may also generate output audio data requesting the user to repeat the utterance (822), when the system(s) 120 is unable to process the initial user utterance (based on ASR processing results). If the ASR processing results are clear, and there may be an error in NLU processing, then the system(s) 120 may not request the user to repeat the utterance, and may instead output an alternative utterance, an error condition or may fail silently.

In this manner, the false wake detection component 265 analyzes various data and features available to the conversation recovery component 285 at runtime to determine if the user intended to wake the device. The device 110 may pick up background speech and may believe the user is trying to wake the device, in which case, the false wake detection component 265 may generate a low confidence score indicating a high likelihood of false wake. For example, in a situation where there are two people speaking in the same room, and one of them tries to ask the device 110 about the time or weather, while the other person is talking about something else. The device 110 receives audio data that includes speech from both persons. The audio data provided to the ASR component may be a long audio stream containing multiple utterances, and the ASR component may require a lot of effort in terms of nodes and latency to decode the audio data and generate the ASR text. The false wake detection component 265 may generate a low confidence score based on the data available to the conversation recovery component 285 indicating a high likelihood of false wake.

Figure 9:
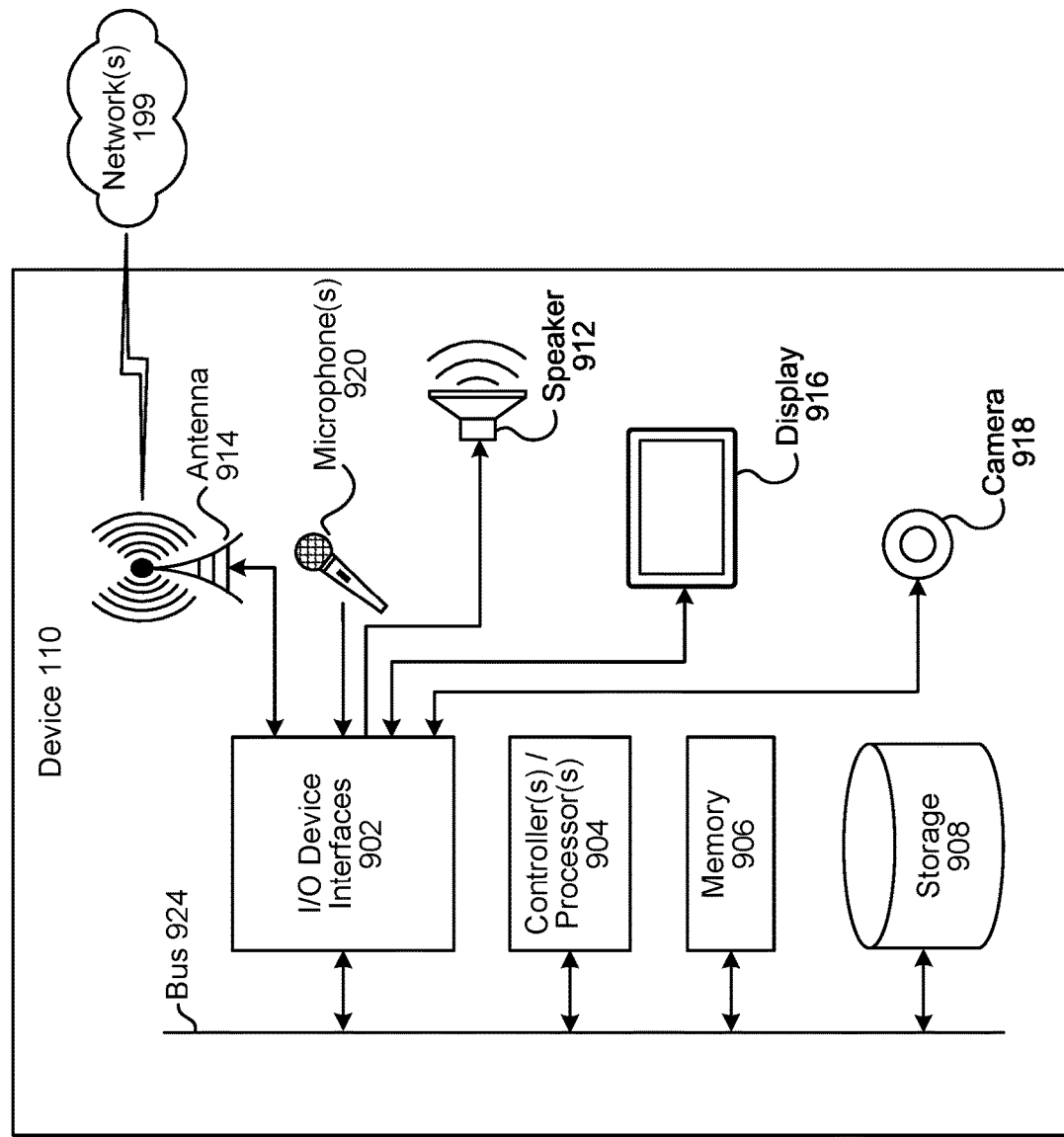
FIG. 9 is a block diagram conceptually illustrating example components of a device according to embodiments of the present disclosure.
Figure 10:
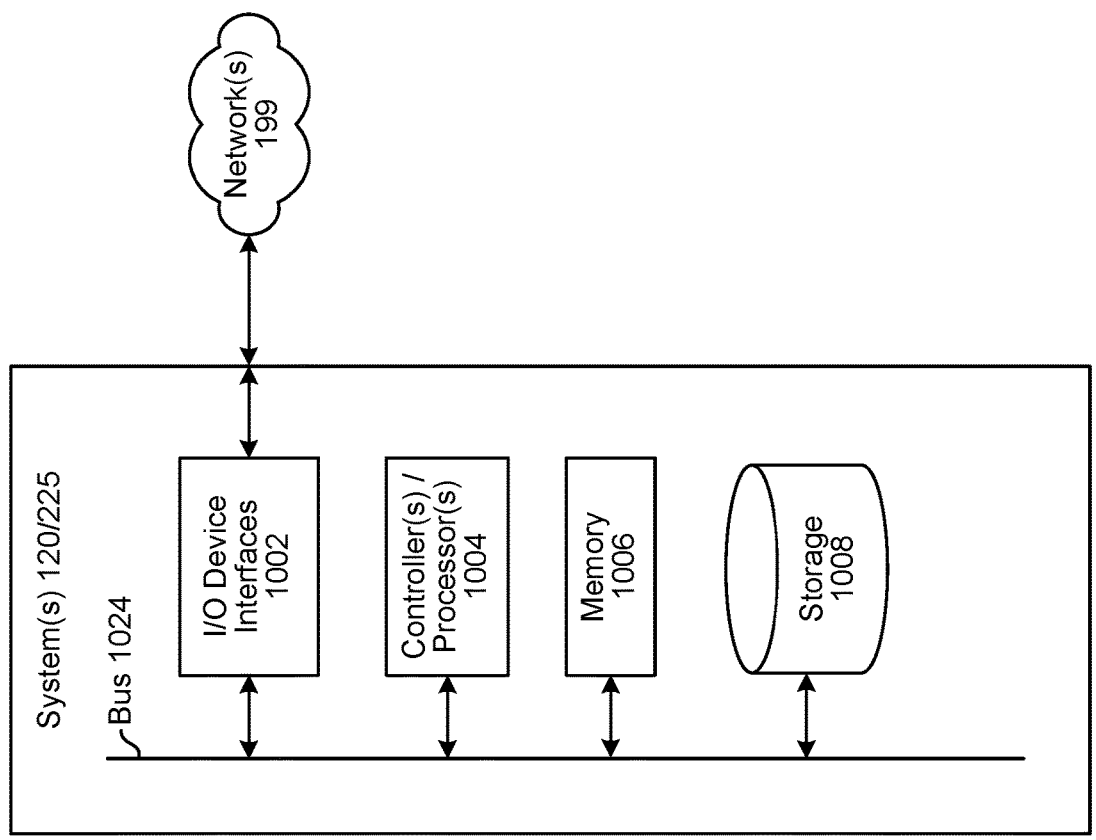
FIG. 10 is a block diagram conceptually illustrating example components of a system according to embodiments of the present disclosure.

FIG. 9 is a block diagram conceptually illustrating a device 110 that may be used with the system. FIG. 10 is a block diagram conceptually illustrating example components of a remote device, such as the system(s) 120, which may assist with ASR processing, NLU processing, etc., and the skill system(s) 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the overall system of the present disclosure, such as one or more systems 120 for performing ASR processing, one or more systems 120 for performing NLU processing, one or more skill systems 225 for performing actions responsive to user inputs, etc. In operation, each of these systems may include computer-readable and computer-executable instructions that reside on the respective device (120/225), as will be discussed further below.

Each of these devices (110/120/225) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120/225) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (902/1002).

Computer instructions for operating each device (110/120/225) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120/225) includes input/output device interfaces (902/1002). A variety of components may be connected through the input/output device interfaces (902/1002), as will be discussed further below. Additionally, each device (110/120/225) may include an address/data bus (924/1024) for conveying data among components of the respective device. Each component within a device (110/120/225) may also be directly connected to other components in addition to (or instead of) being connected to other components across the bus (924/1024).

Referring to FIG. 9, the device 110 may include input/output device interfaces 902 that connect to a variety of components such as an audio output component such as a speaker 912, a wired headset or a wireless headset (not illustrated), or other component capable of outputting audio. The device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 916 for displaying content. The device 110 may further include a camera 918.

Via antenna(s) 914, the input/output device interfaces 902 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device(s) 110, the system(s) 120, or the skill system(s) 225 may include their own dedicated processors, memory, and/or storage. Alternatively, one or more of the components of the device(s) 110, the system(s) 120, or the skill system(s) 225 may utilize the I/O interfaces (902/1002), processor(s) (904/1004), memory (906/1006), and/or storage (908/1008) of the device(s) 110 system(s) 120, or the skill system(s) 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 225, as described herein, are illustrative, and may be located as a stand-alone device or may be included, in whole or in part, as a component of a larger device or system.

Figure 11:
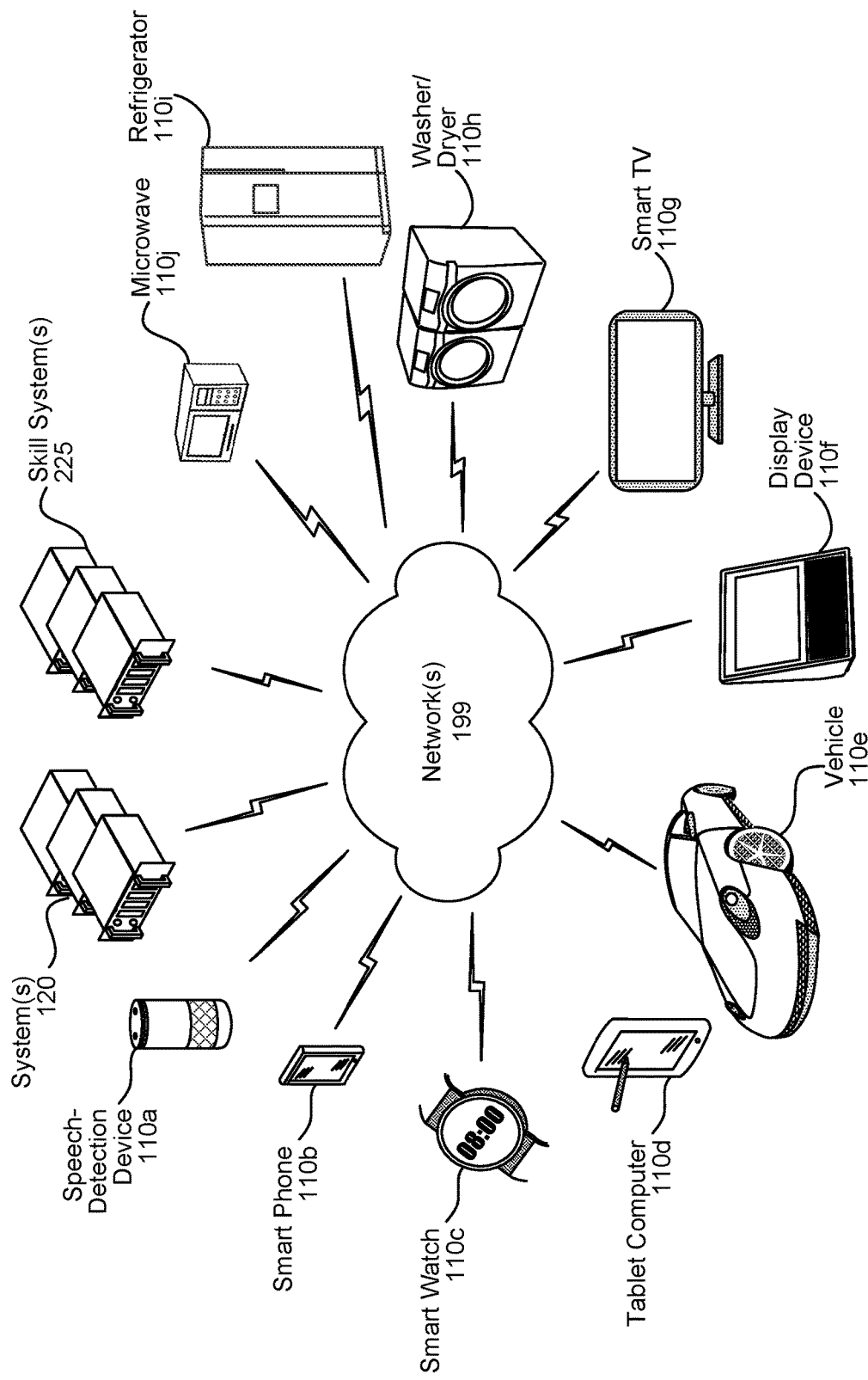
FIG. 11 illustrates an example of a computer network for use with the speech processing system.

As illustrated in FIG. 11, multiple devices (110a-110j, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a microwave 110j may be connected to the network(s) 199 through a wireless service provider, over a WiFi or cellular network connection, or the like. Other devices are included as network-connected support devices, such as the system(s) 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A system comprising:
   at least one processor; and
   at least one memory comprising instructions that, when executed by the at least one processor, cause the system to:
   receive input data corresponding to a user input;
   based at least in part on a similarity of sound between the user input and a first representation, generate first output data proposing the first representation to be used to respond to the user input;
   receive a response confirming the first representation is to be used;

determine first application data associated with the first representation; and generate second output data based on the first application data.

2. The system of claim 1, wherein the at least one memory further comprises instructions that, when executed by the at least one processor, further cause the system to:

performing speech processing on the input data to determine results data, wherein generation of the first output data is based at least in part on the results data.

3. The system of claim 2, wherein the speech processing comprises natural language processing and the results data comprises a confidence score.

4. The system of claim 1, wherein the at least one memory further comprises instructions that, when executed by the at least one processor, further cause the system to:

perform automatic speech recognition (ASR) processing using the input data to determine ASR confidence data; and determine the ASR confidence data fails to satisfy a condition, wherein generation of the first output data is based at least in part on the ASR confidence data failing to satisfy the condition.

5. The system of claim 4, wherein the ASR confidence data is based at least in part on the similarity of sound.

6. The system of claim 1, wherein the first representation corresponds to an alternative for the input data.

7. The system of claim 1, wherein the at least one memory further comprises instructions that, when executed by the at least one processor, further cause the system to:

query a storage using at least a portion of the input data to determine a plurality of candidate input representations, the storage storing data representing a mapping between sample input data and system actionable data; and identify the first representation based on the plurality of candidate input representations.

8. The system of claim 7, wherein the at least one memory further comprises instructions that, when executed by the at least one processor, further cause the system to:

determine the plurality of candidate input representations based at least in part on a keyword represented in the user input.

9. The system of claim 7, wherein the plurality of candidate input representations correspond to past inputs made by a plurality of users.

10. The system of claim 1, wherein the at least one memory further comprises instructions that, when executed by the at least one processor, further cause the system to:

perform speech processing using the input data to determine speech processing results data; and process the input data and the speech processing results data using a machine learning component to determine model output data representing a first likelihood that the input data corresponds to a false wake of a first device, wherein generation of the first output data is based at least in part on the model output data.

11. A computer-implemented method, comprising:

receiving input data representing an utterance spoken to a first device;

performing speech processing using the input data to determine speech processing results data;

processing the input data and the speech processing results data using a machine learning component to determine model output data representing a first likelihood that the input data corresponds to a false wake of the first device;

generating first output data requesting confirmation of an intended wake of the first device;

receiving a response to the first output data; and performing an action based at least in part on the response.

12. The computer-implemented method of claim 11, further comprising:

receiving, from an automatic speech recognition component, the speech processing results data, wherein the speech processing results data comprises score data.

13. The computer-implemented method of claim 12, wherein the score data represents a likelihood a user is conversing with the first device.

14. The computer-implemented method of claim 11, further comprising:

receiving, from a natural language understanding component, the speech processing results data.

15. The computer-implemented method of claim 11, further comprising:

prior to generating the first output data, determining the first likelihood satisfies a condition.

16. The computer-implemented method of claim 11, further comprising:

receiving dialog data corresponding to the first device, wherein the machine learning component further processes the dialog data to determine the model output data.

17. The computer-implemented method of claim 11, wherein the first output data requesting confirmation comprises a request for a repeat of the utterance.

18. The computer-implemented method of claim 11, further comprising:

receiving latency data corresponding to the utterance, wherein the machine learning component further processes the latency data to determine the model output data.

19. The computer-implemented method of claim 11, further comprising:

determining the response corresponds to an indication to perform processing;

determining second output data responsive to the utterance; and causing presentation of the second output data.

20. The computer-implemented method of claim 11, further comprising:

determining the response corresponds to an indication to stop processing; and termination processing with regard to the input data.

* * * * *